(12) United States Patent
Cavelius

(10) Patent No.: US 9,315,337 B2
(45) Date of Patent: Apr. 19, 2016

(54) DEVICE FOR LAYERED STACKING A SUPPORT

(71) Applicant: Joerg Cavelius, Frankfurt (DE)
(72) Inventor: Joerg Cavelius, Frankfurt (DE)
(73) Assignee: Dematic GmbH, Offenbach (DE)
(*) Notice: Subject to any disclaimer, the term of this patent is extended or adjusted under 35 U.S.C. 154(b) by 124 days.
(21) Appl. No.: 14/236,845
(22) PCT Filed: Jun. 26, 2013
(86) PCT No.: PCT/EP2013/063344
§ 371 (c)(1),
(2) Date: Feb. 3, 2014
(87) PCT Pub. No.: WO2014/005895
PCT Pub. Date: Jan. 9, 2014

(65) Prior Publication Data
US 2014/0174885 A1    Jun. 26, 2014

(30) Foreign Application Priority Data
Jul. 6, 2012  (DE) .......................... 10 2012 106 109

(51) Int. Cl.
*B65B 35/40*    (2006.01)
*B65B 35/30*    (2006.01)
(Continued)

(52) U.S. Cl.
CPC ............. *B65G 47/261* (2013.01); *B65B 35/40* (2013.01); *B65G 47/086* (2013.01); *B65G 57/035* (2013.01); *B65G 57/245* (2013.01); *B65G 59/026* (2013.01); *B65G 57/20* (2013.01)

(58) Field of Classification Search
CPC ...... B65G 47/086; B65G 61/00; B65G 47/08; B65G 57/22; B65G 57/24; B65G 57/02; B65G 57/00; B65B 35/50; B65B 61/20
USPC ................... 198/418.9, 433, 468.1, 597, 601; 414/790.3, 791.5, 791.6, 792.6, 792.7, 414/794.7, 799
See application file for complete search history.

(56) References Cited

U.S. PATENT DOCUMENTS

| | | | | |
|---|---|---|---|---|
| 2,090,129 A | * | 8/1937 | Kimball ................. | B65G 47/82 198/427 |
| 2,883,074 A | * | 4/1959 | Boehl et al. ................ | 414/789.6 |

(Continued)

FOREIGN PATENT DOCUMENTS

| | | |
|---|---|---|
| DE | 1931274 B2 | 4/1975 |
| DE | 3614256 A1 | 10/1987 |

(Continued)

OTHER PUBLICATIONS

International Preliminary Report on Patentability from corresponding Patent Cooperation Treaty Patent Application No. PCT/US2013/063344 issued Jan. 6, 2015.

(Continued)

*Primary Examiner* — Gregory Adams
(74) *Attorney, Agent, or Firm* — Gardner, Linn, Burkhart & Flory, LLP

(57) ABSTRACT

Device for automatic stacking of packages on a support in a predetermined spatial arrangement for formation of a stack, having at least one supply conveyor which provides the separated packages (W) in a predetermined succession, a lifting and lowering unit for lifting and lowering a support disposed in a stacking site in the Y direction and a displacement device which adjoin an output end of the supply conveyor and which receive packages (W) from the supply conveyor (2) and transport them to the predetermined position in the stack (S). The displacement device includes a positioning conveyor adjoining the output end of the supply conveyor and being disposed horizontally and longitudinally with respect to one side of the stacking site in order to position the packages (W) in the X direction, and at least one pushing plate and a pusher (14) in order to transport the packages (W) from the positioning conveyor in the Z direction to the predetermined position in the stack (S). The at least one pushing plate is formed as a flat strip-like plate, formed to be able to move horizontally and along the side of the stacking site and transverse thereto, in order to receive the packages (W) as the packages (W) are being pushed by the pusher off the positioning conveyor at the X direction position and to lay them in the Z direction on the support or in the stack (S). The pusher is formed as an arrangement of a plurality of individual pushers disposed horizontally and along the side of the stacking site, which push the packages (W) off the positioning conveyor in the direction of the stack (S), wherein the individual pushers can each move independently of the at least one pushing plate in the Z direction in order to retain the package (W) when the pushing plate is being withdrawn.

20 Claims, 26 Drawing Sheets

(51) Int. Cl.
*B65G 47/04* (2006.01)
*B65G 47/08* (2006.01)
*B65G 47/26* (2006.01)
*B65G 59/02* (2006.01)
*B65G 57/03* (2006.01)
*B65G 57/24* (2006.01)
*B65G 57/20* (2006.01)

(56) References Cited

U.S. PATENT DOCUMENTS

| | | | | |
|---|---|---|---|---|
| 3,056,513 | A | * | 10/1962 | Von Gal, Jr. ............... 414/792.6 |
| 3,068,624 | A | * | 12/1962 | Linda ...................... B65B 5/06 53/523 |
| 3,257,015 | A | | 6/1966 | Annable et al. ................ 414/802 |
| 3,543,949 | A | * | 12/1970 | Weier ...................... 414/796.8 |
| 3,923,144 | A | * | 12/1975 | Langen .................... B65B 5/06 198/429 |
| 3,967,737 | A | * | 7/1976 | Peralta et al. ................ 198/433 |
| 4,162,016 | A | * | 7/1979 | Schmitt ..................... 414/794.3 |
| 4,302,140 | A | * | 11/1981 | Donnelly et al. .......... 414/790.3 |
| 4,442,932 | A | * | 4/1984 | Sashiki et al. ........... 198/370.07 |
| 4,638,903 | A | * | 1/1987 | Kimura ................ B65G 47/086 198/418.5 |
| 4,744,457 | A | * | 5/1988 | Takimoto ............. B65G 47/086 198/426 |
| 4,898,511 | A | | 2/1990 | Rossig et al. |
| 5,181,820 | A | | 1/1993 | Sjogren et al. |
| 5,360,306 | A | * | 11/1994 | Nakayama et al. ...... 414/331.08 |
| 5,407,055 | A | * | 4/1995 | Tanaka .......................... 198/429 |
| 6,845,860 | B1 | * | 1/2005 | Walker ......................... 198/433 |
| 7,047,710 | B2 | | 5/2006 | Winkler |
| 7,686,153 | B2 | * | 3/2010 | Tsai ........................... 198/347.1 |
| 8,468,781 | B2 | | 6/2013 | Fritzsche et al. |
| 2010/0178149 | A1 | | 7/2010 | Fritzsche |

FOREIGN PATENT DOCUMENTS

| | | |
|---|---|---|
| DE | 3835058 A1 | 4/1990 |
| EP | 0487837 A1 | 6/1992 |
| EP | 1321396 A1 | 6/2003 |
| EP | 1462394 B1 | 8/2006 |
| GB | 2003818 A | 3/1979 |
| WO | 2010059923 A1 | 5/2010 |

OTHER PUBLICATIONS

International Search Report and Written Opinion of the International Searching Authority from corresponding Patent Cooperation Treaty (PCT) Application No. PCT/EP2013/063344, mailed Oct. 17, 2013.

* cited by examiner

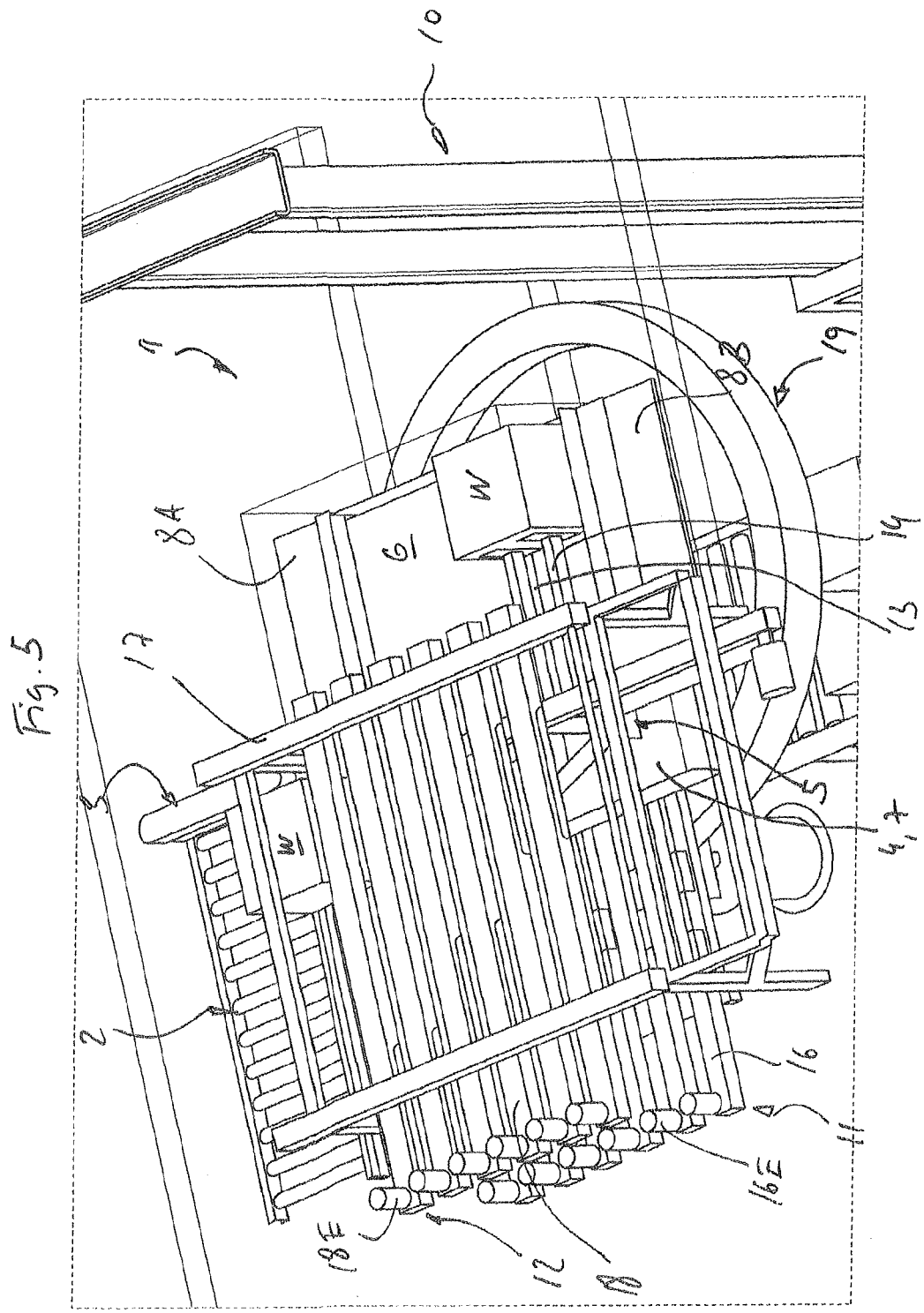

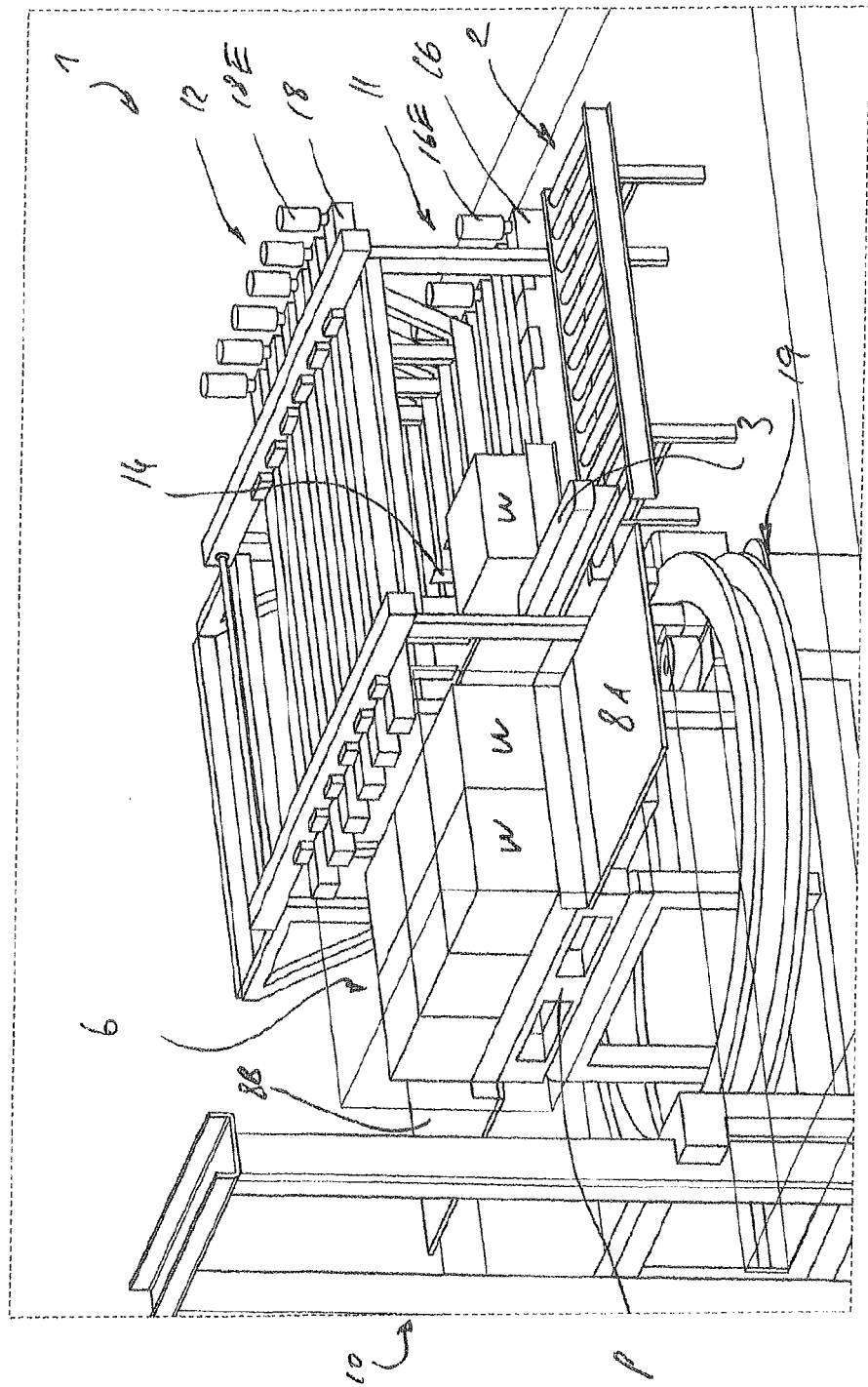

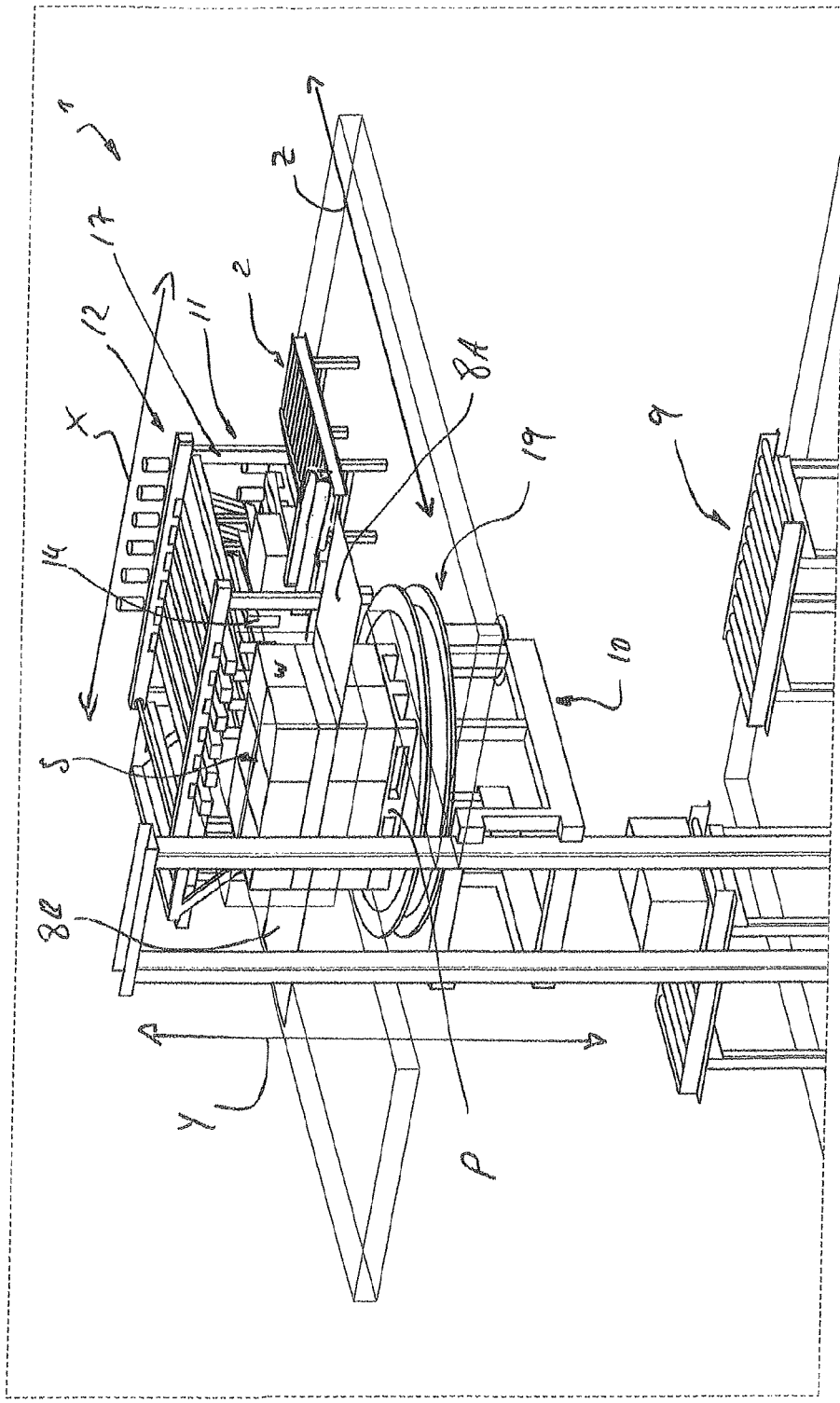

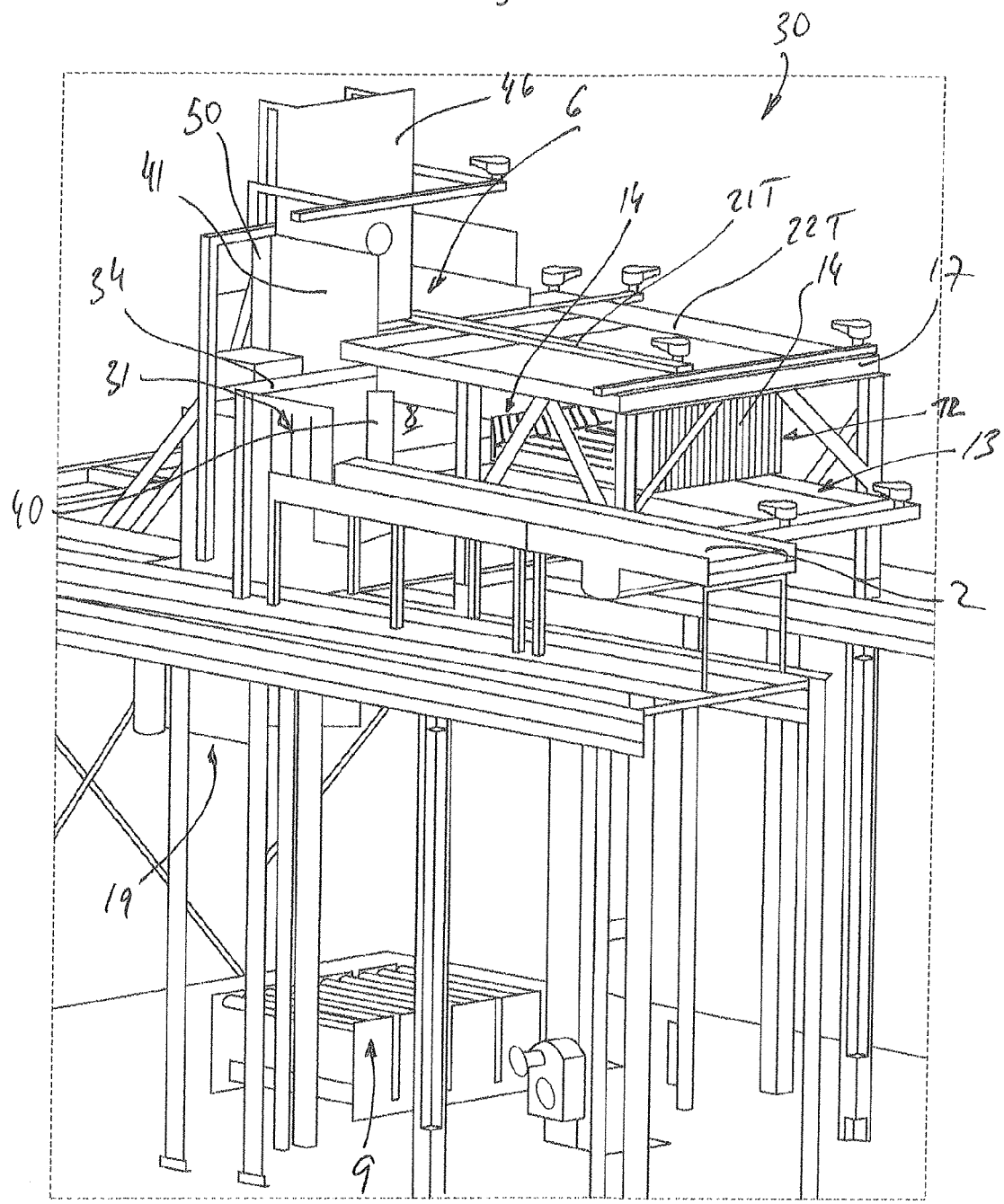

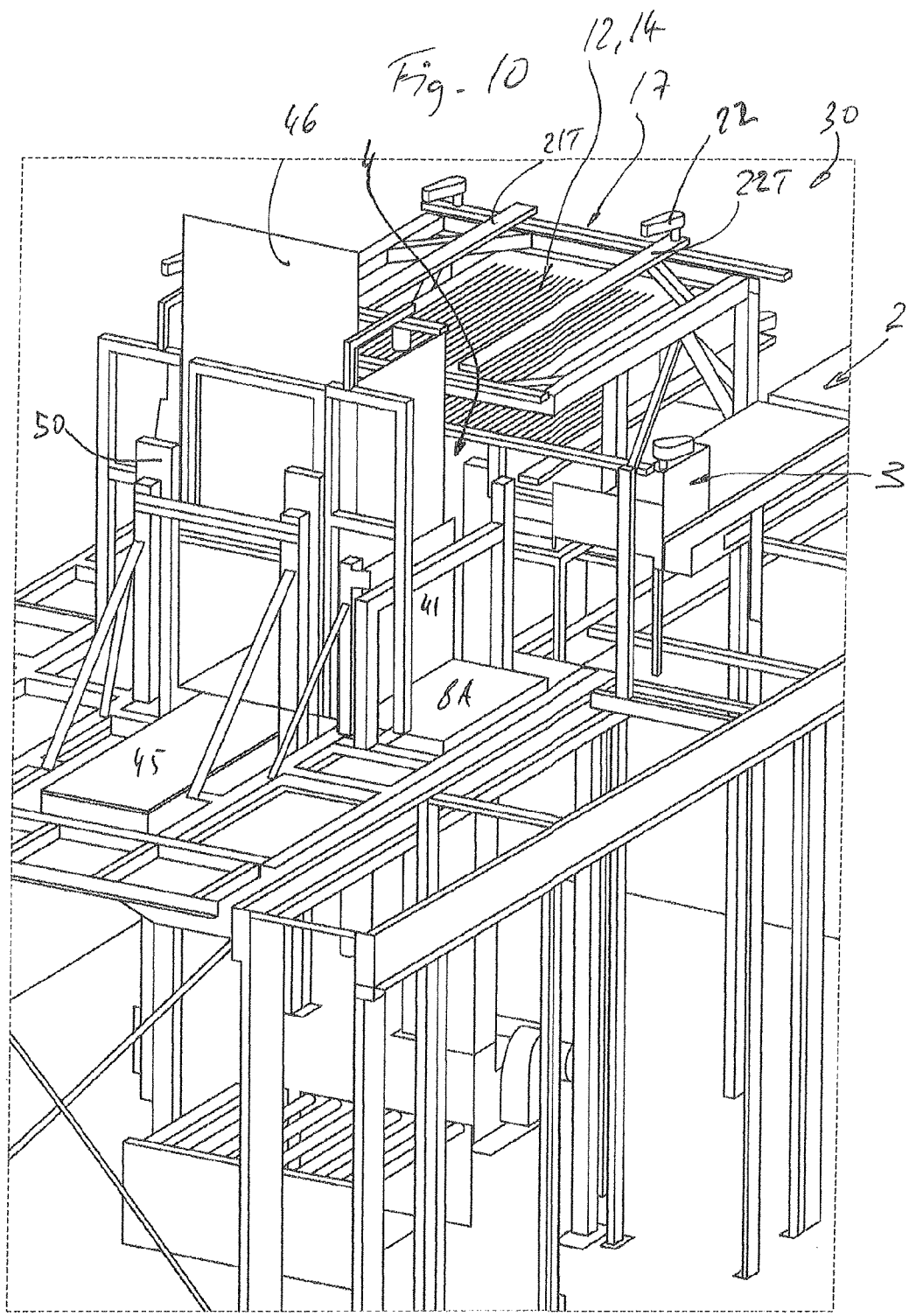

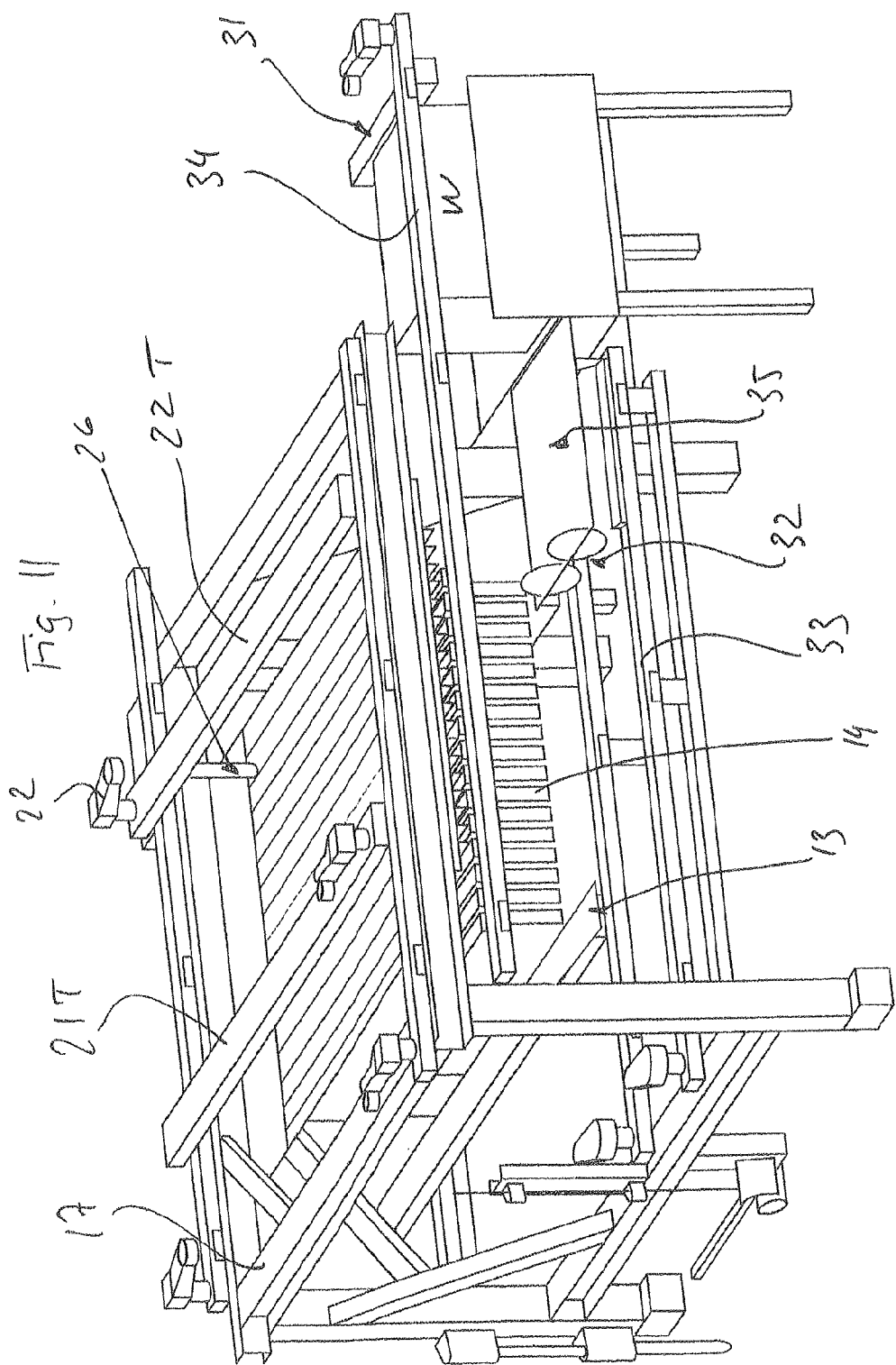

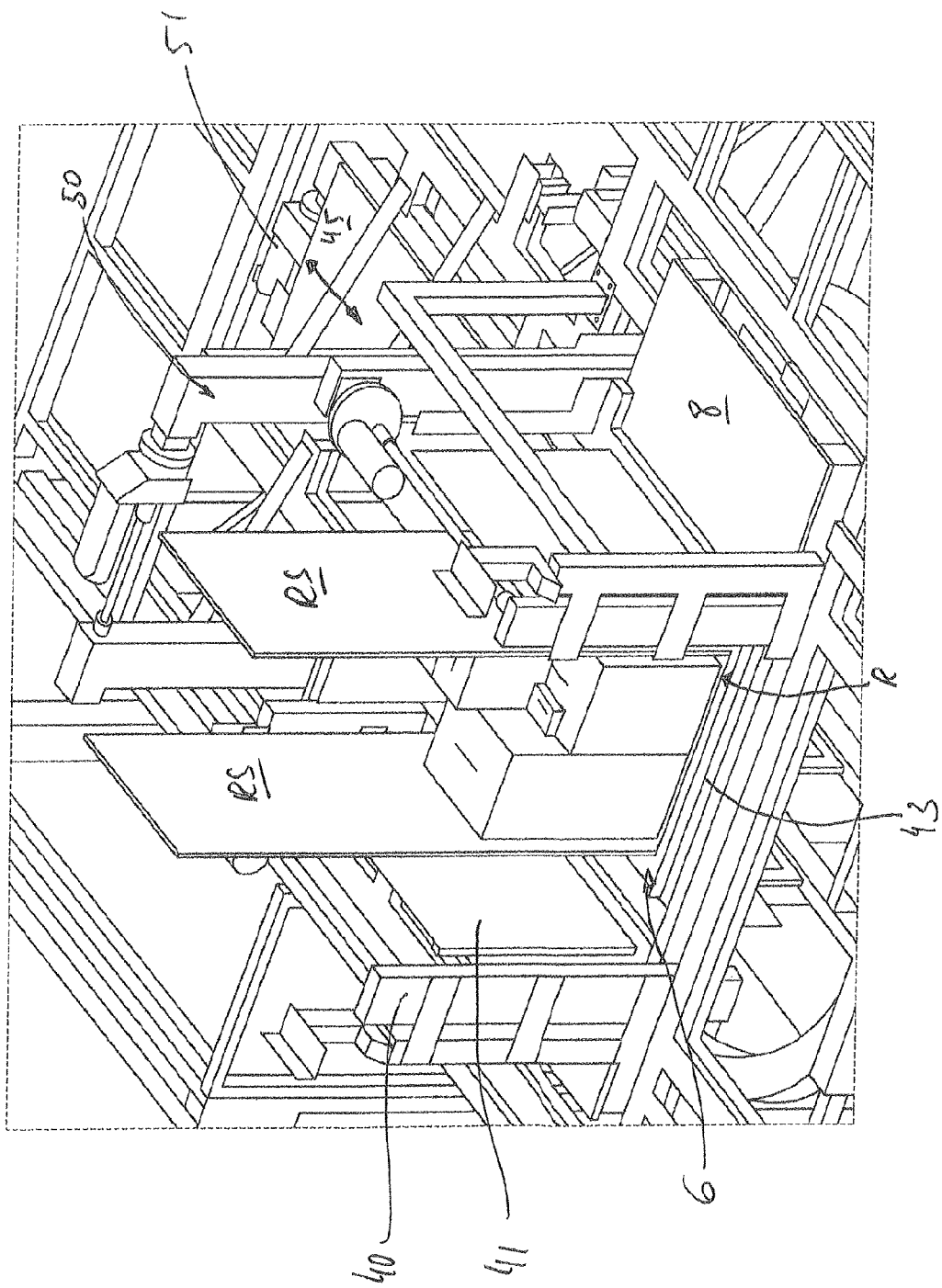

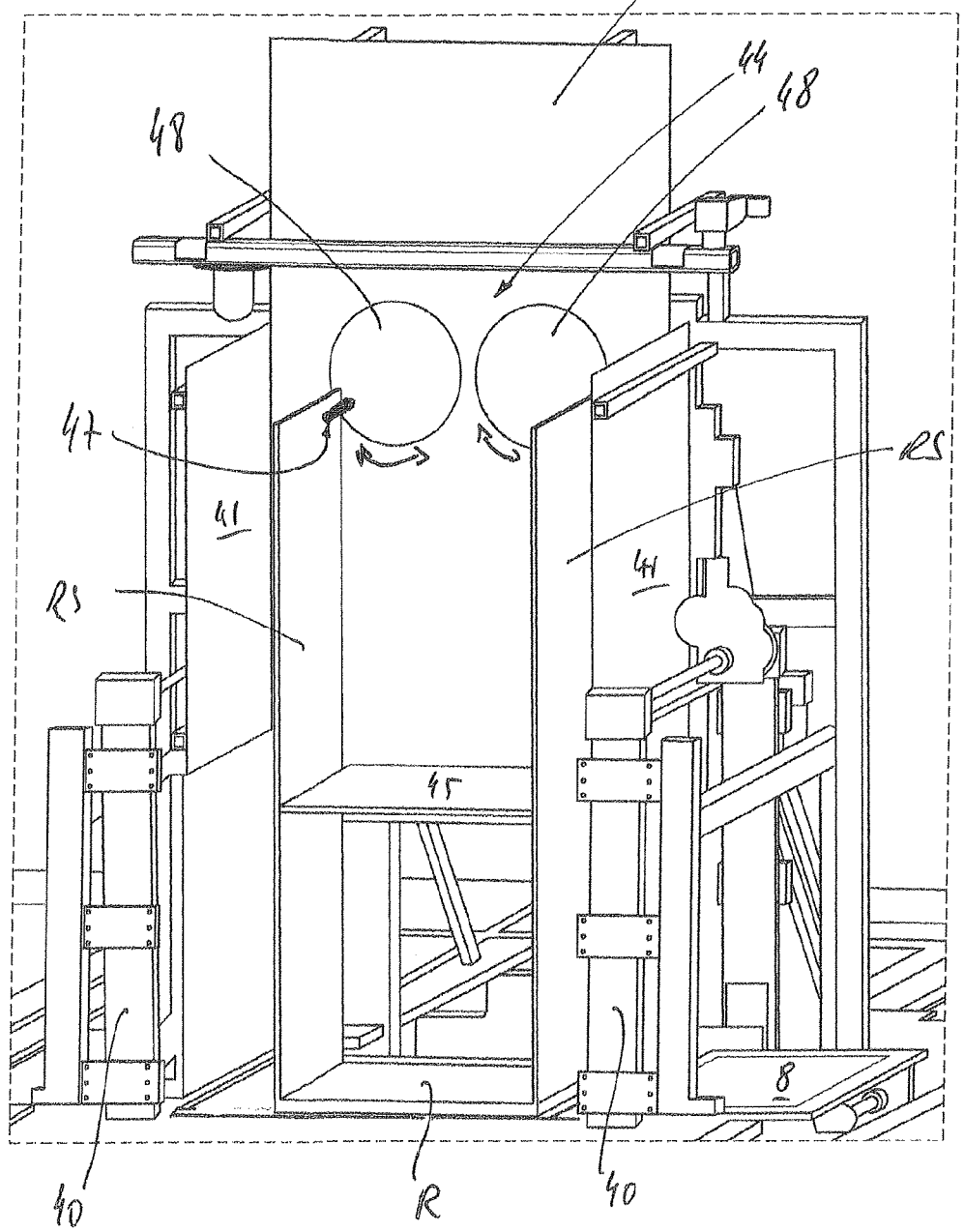

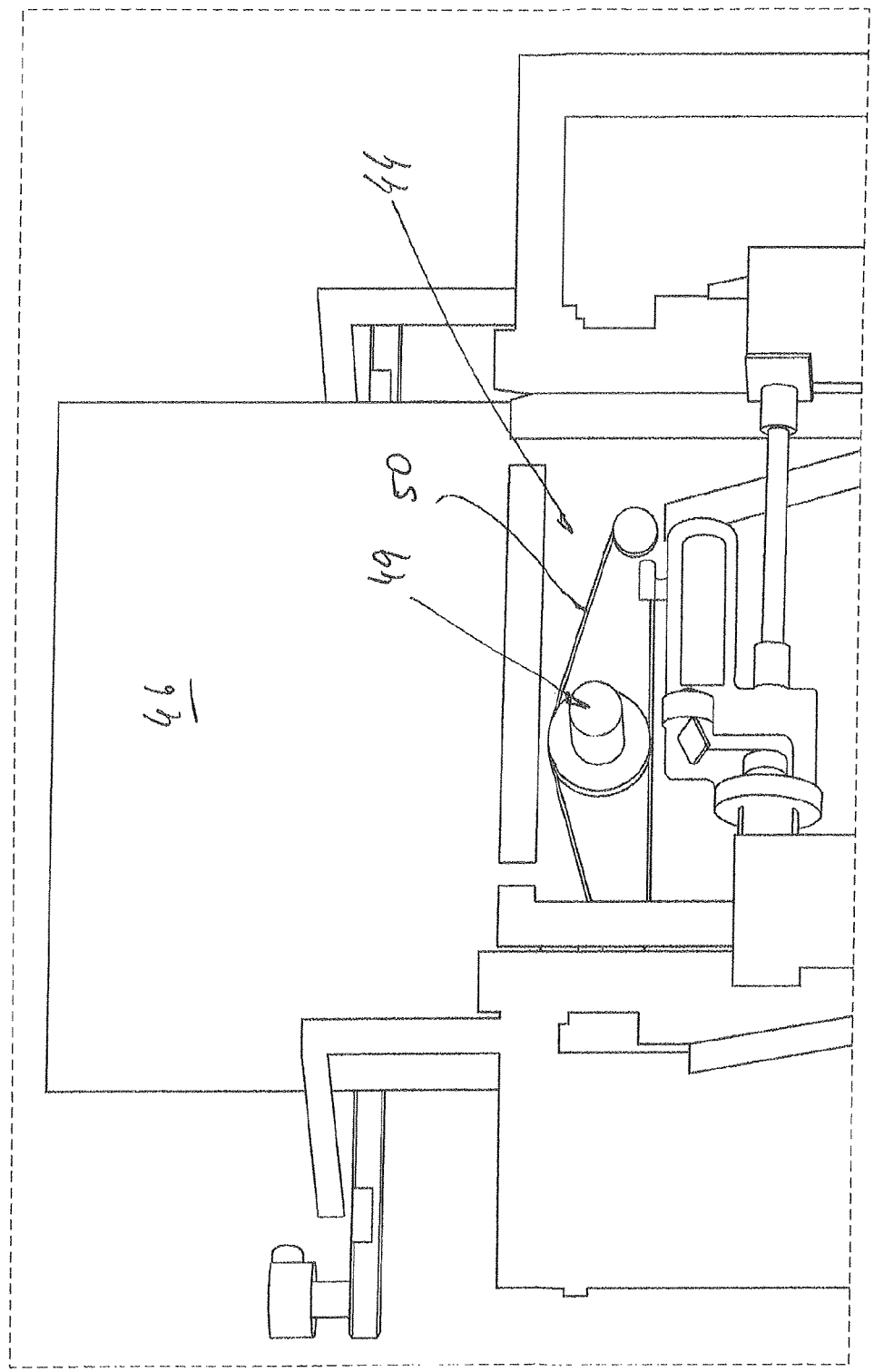

DEVICE FOR LAYERED STACKING A SUPPORT

CROSS REFERENCE TO RELATED APPLICATION

The present application claims the priority benefits of International Patent Application No. PCT/EP2013/063344, filed on Jun. 26, 2013, which is hereby incorporated herein by reference in its entirety.

BACKGROUND OF THE INVENTION

The invention relates to a device for automatic stacking of package on a support in a predetermined spatial arrangement to form a stack. Automatic stacking onto a support or a carrier, in particular a pallet or a trolley, with package to form a stack for later shipment, i.e. "palletization", is known per se. However, in this respect, packages of uniform size or dimension are placed by robots, grabs, etc., at arithmetically determined sites. In contrast, the process of automatically loading a load support with packages with different specifications to form a stack is so-called "mixed-case" palletization. In current distribution logistics, ever greater demands are placed on picking. Picking systems, therefore, need to be developed which process orders automatically without manual intervention.

Thousands of different products (or package) of the most varied possible specifications (size, shape, weight, dimensions, surfaces, solidity, etc.) must be picked automatically by such systems.

In this case, it is necessary to consider many aspects which greatly increase complexity compared with the "simple" manual stacking of simple, regular geometries. Thus, a package can be properly stacked or placed on a preceding package only when this has a flat or even surface, which should also be oriented approximately horizontally, and when the package can bear the weight of the further package placed on it without being damaged. Furthermore, the stack formed should have a certain stability in order that, amongst other things, it does not fall over during transportation. Wrapping with film does help, but cannot stabilize an incorrectly formed stack alone. In addition, it is more often the case that the recipient desires the stacks to be optimized with a view to the desired unloading sequence.

Stacking of different packages or goods of different sizes or dimensions is, therefore, still mainly carried out by hand since the requirements of stack stability, packing density within the stack and the loading sequence, as well as the unloading sequence dictated thereby, and not least the stackability of the goods are extremely high and thus far also only partially met by the known methods and devices.

EP 1 462 394 B1 discloses a device for automatic loading of a load support with packing units forming a load stack, i.e., a palletizing device. With this device, the packing units are supplied individually and on boards and are placed therefrom onto a packing table. At that location, the packing unit is displaced, lying on the table, by a pusher along the broad side of the pallet to be loaded until the loading coordinates in the X direction are reached. Then, a further pusher and a loading tongue simultaneously push the packing unit in the direction of the load depth over the pallet until the loading coordinates in the Z direction are reached. Then, the loading tongue returns, wherein the pusher remains stationary and serves as a stripper so that the packing unit is set down on the pallet at the desired location in a "free-fall" manner. The stack being formed is supported by a loading aid on the remaining three sides. It is virtually a case of "against the wall" stacking. However, the displacement on the packing table is time-consuming and, owing to limited accessibility, is disadvantageous for formation of the packing patterns. In addition, it is necessary for the loading tongue and the stripper/pusher to travel simultaneously in the X direction. Moreover, only one packing unit can ever be "processed" at a time.

WO 2010/059923 A1 discloses an automatic robot-assisted stacking device in which an intermediate plate for formation of the first layer of a stack and simultaneous pallet change is used.

SUMMARY OF THE INVENTION

The present invention provides a device for automatic stacking of pages onto a support in a predetermined spatial arrangement for formation of a stack that flexibly permits mixed-case stacking with a high throughput.

A device for automatic stacking of packages on a support in a predetermined spatial arrangement for formation of a stack, according to an aspect of the invention, includes at least one supply conveyor which provides the separated packages (W) in a predetermined succession; a lifting and lowering unit for lifting and lowering a support disposed in a stacking site in a vertical Y direction; and a displacement device which adjoin an output end of the supply conveyor and which receive packages (W) from the supply conveyor and transport the packages to the predetermined position in the stack (S). The displacement device includes a positioning conveyor adjoining the output end of the supply conveyor and being disposed horizontally and longitudinally with respect to one side of the stacking site in order to position the packages (W) in an X direction; and at least one pushing plate and a pusher in order to transport the packages (W) from the positioning conveyor in a Z direction to the predetermined position in the stack (S). The at least one pushing plate is formed as a flat strip-like plate, formed to be able to move horizontally and along the side of the stacking site and transverse thereto, in order to receive the packages (W) as the packages (W) are being pushed by the pusher off the positioning conveyor at the X direction position and to lay the packages (W) in the Z direction on the support or in the stack (S). The pusher is formed as an arrangement of a plurality of individual pushers disposed horizontally and along the side of the stacking site that push the packages (W) off the positioning conveyor in the direction of the stack (S), wherein the individual pushers can each move independently of the at least one pushing plate in the Z direction in order to retain the package (W) when the pushing plate is being withdrawn.

The pusher is formed as an arrangement of a plurality of individual pushers disposed horizontally and along the side of the stacking site, i.e., is formed as a row, which pushes the package off the positioning conveyor in the direction of the stack. The individual pushers can move independently of the at least one pushing plate in the Z direction in order to retain the package during withdrawal of the pushing plate, the package can be positioned in a more variable manner and, in addition, a plurality of packages can be stacked with less time-offset or even simultaneously.

One variation, not all individual pushers have their own drive, but have at least one or two common drives which can be coupled selectively to a specific individual pusher in order to drive same. In addition, the drive can be movable and, via a coupling element, come into engagement with a drive carriage of the respective (adjoining) individual pusher(s).

The individual pushers may thus be suspended from a frame on which they are able to move in the Z direction towards (or away from) the stack. To this end, they are also approached by a carriage or cross-member disposed above and extending transverse thereto, i.e., in the X direction, which carriage or cross-member supports the drive, wherein a coupling or carrier element produces the operative connection between the drive and individual pusher. The carrier element depends in a sheet-like or strip-like manner from the drive or its travel cross-member and engages in an upwardly open groove on the drive carriage of the adjoining individual pusher(s), for which purpose the carrier is of an appropriate width.

Two such moveable common drives may be provided, one from each side in the X direction of the frame or upstream and downstream in the X direction coming to, or positioned at, the stacking site. The arrangement of the individual pushers can extend over the full length of the positioning conveyor, then the individual pushers can be formed to be immovable in the X direction or conveying direction of the positioning conveyor. Alternatively, it is also feasible to provide correspondingly fewer individual pushers, but at least two, and then to form these to be adjustable in the X direction for compensation purposes.

In one embodiment, the at least one pushing plate is formed as a flat strip-like plate formed to be able to move horizontally and along the side of the stacking site and transverse thereto, which plate narrows in the direction of the stacking plate. The pushing plate is suspended on the side of the positioning conveyor opposite the support. At that location, it is attached possibly to the same frame as the individual pushers. If more than one pushing plate is provided, these can be disposed in parallel and next to each other.

The at least one pushing plate may be able to move back and forth in a carriage-like manner in each case on a linear axle oriented in the Z direction. Therefore, in a simple manner, it can be extended towards the stack and retracted in the required Z direction and is nevertheless rigid enough through the long support surface or plurality of support points. Driving can be effected, for example, via a toothed belt, a rack, or the like. It will be understood that the pushing plate engages below or through the positioning conveyor depending on the design of the latter, in order to position a package on the other side in the stack.

It is also possible to form the at least one pushing plate to be moveable in the longitudinal direction (X direction) of the positioning conveyor, in particular if only one or a few, preferably two, pushing plates are provided. These can then be moved together or independently of one another. If they are moveable independently of one another, a plurality of packages can be displaced simultaneously onto the support or into the stack.

Alternatively, according to the number of individual pushers, a corresponding number of pushing plates can also be distributed uniformly over the length of the positioning conveyor. Displaceability in the X direction is then not necessary. Each pushing plate may then be "allocated" to an individual pusher and disposed with the individual pusher in a vertical plane, i.e., disposed in alignment one above the other as seen from above. The pushing plates can also be formed with common drives, analogously to the individual pushers.

It is also possible to control selected individual pushers jointly so that, for example, two to four adjoining individual pushers jointly move a larger package at the same time. The pushing plates can also be controlled jointly in a corresponding manner.

In order to provide for constructionally simple and unhindered suspension, the arrangement of the individual pushers may be attached to a frame extending above the positioning conveyor. The frame rests preferably on rail-like profiles and also serves as a support or suspension for the pushing plates. The frame together with the arrangement of the individual pushers and the pushing plates therefore forms a modular pusher-pushing plates unit.

In the case of automatic systems and procedures of high complexity, such as the present case, disruption can occur in spite of all planning to the contrary, for example because a package falls over during stacking. Manual intervention by a human operator is then needed. In order to permit or facilitate his/her intervention, provision is made in one embodiment that the frame is able to move away from the stacking site jointly with the unit consisting of the pusher and pushing plates, this being effected manually or in a driven manner. For this purpose, the unit may be displaceable in a rail-like manner, particularly by a drive. The drive may be a spindle which is driven manually or by motor. The positioning conveyor may be attached to the frame so that the positioning conveyor is also "removable". This option for manually rectifying a problem or loading increases the availability of the device.

Two alternatives are disclosed for the design of the positioning conveyor. However, it will be understood that any design which permits the package to adopt the X position can be used. If the positioning conveyor is formed as an endless conveyor, it is possible, on the one hand, to achieve a high level of performance by means of the endless conveyor and on the other hand to handle the packing items securely. In so doing, it is possible to transport and displace a plurality of packing items at the same time. In addition, construction and control are simple.

An endless conveyor is understood to be a conveyer in which an endless belt circulates and forms a unitary surface. Possible endless conveyors in terms of the invention are belt conveyors, band conveyors, carrying-chain conveyors, apron conveyors and slat conveyors. The at least one pushing plate may engage through between the upper run, i.e., the upper portion on which conveying takes place, and the lower run, i.e., the lower return portion, of the endless conveyor so that a particularly compact construction is achieved. If a stop, which is able to move in the X direction and optionally also in the Z direction, for the package disposed on the endless conveyor is disposed above the endless conveyor for the purpose of fine-tuning of the position in the X direction, the package can be positioned in a particularly simple and precise manner. Depending on the design of the surface of the endless conveyor, this conveyor does not need to be stopped even once but can continue to run while the package "slides" on its surface.

The use of stop fins on the endless conveyor, in particular on the surface of the upper run, is also possible for precise positioning of the package. The positioning conveyor could then possibly be operated in reverse so that the stop fins do not have to circulate. If sufficient space is provided, the stop fins could also circulate. Alternatively, the positioning conveyor can be formed as a travelling carriage or shuttle which can travel to and fro on rails disposed therefor in the X direction along the stacking site or the substrate and transports a respective package to the X position provided.

The travelling carriage may be formed with a C-shaped frame so that then the at least one pushing plate can engage through between the limbs of the "C" so that there is no mutual obstruction. This also makes it possible for the travelling carriage—after completed "transfer" of the package to the pushing plate prior to termination of the stacking process—to travel back in order to receive the next package from the supply conveyor.

In order to ensure that the packages do not fall from the travelling carriage and are precisely positioned, this travelling carriage has a stop on the side remote from the supply conveyor in the X direction. In an embodiment, the stop is able to move away from the stop position, it might be able to fold away therefrom so that, after completed "transfer" of the package to the pushing plate, the travelling carriage can "pick up" the next packing item.

Between the supply conveyor and the positioning conveyor a transfer device for the package can be disposed. This can be designed as a pusher. It is thus possible for the pusher, together with the travelling carriage, to transport the package to the desired X position so that the package is transported virtually "clamped in" between the pusher and the lateral stop of the travelling carriage. High accelerations and speeds during positioning are therefore possible without the risk of displacement, falling, or the like.

Therefore, in one variation, the pusher is moveably suspended from and driven on a rail extending along the support and in parallel with the positioning conveyor.

However, it is also feasible for the supply conveyor to bring the package directly onto the positioning conveyor without interpositioning of a transfer device. In one variation, the supply conveyor terminates for this purpose perpendicular to the positioning conveyor and "pushes" the package directly onto the positioning conveyor. All in all it is thus possible to carry out stacking on the support in a flexible, high-performance manner. In particular, a broad range of different packages can be stacked continuously. Thus, in addition to the fairly undemanding packages, which are of the same shape and obviously also manageable, packages with the most widely different dimensions can be stacked on the support one after another. Packages can be the widest range of goods, packaged goods, goods packed in groups, such as cartons, boxes, crates, containers, goods on boards, packing units such as, for example, film-wrapped multi-packs of plastics bottles, etc., as well as individual articles of all types.

The support can be intermediate plates or supports such as pallets, trolleys or similar supports for piece goods and their packaging. Supply conveyors are understood to be conveyors in general and in particular roller conveyors, conveyor belts and conveyor systems. These can be loaded manually or automatically. The packages are delivered on the conveying apparatus individually and in the correct succession for the desired packing sequence. The correct succession is determined arithmetically when an order is being processed. Appropriate software for this purpose is known. The distinctive feature is that the packages are delivered on the supply conveyor without auxiliary means such as boards, containers, or the like.

The packages are thus delivered individually. However, it is also possible to assemble groups of identical or very similar packaged or unpackaged packages for joint handling. This grouping then takes place either in the region for receiving the package from the supply conveyor by the displacement means or even when the supply conveyor is being loaded. The particular design of the pusher as a row means that precisely such package can be displaced and/or positioned jointly. It is also favourable if the packages are oriented by the displacement device prior to being received. This permits standardized and therefore simplified receiving of the packages by the displacement means. Alternatively or additionally, corresponding optical processes can also be used to detect the orientation of the package and to control the displacement means in order to achieve orientation therewith. Orientation can be effected, for example, by the transfer device. The moveable stop can also be used for orientation purposes. It is useful if the stack on the support is stabilized during and/or after stacking. The individual layers therefore retain their structure and the stacked support can be transported more securely.

For stabilization purposes after stacking (completely or of individual layers), the stack together with the stacked support can be stabilised by being wrapped with film, netting or the like. It can be wrapped in layers gradually during stacking or after stacking of a layer. Stabilization takes place within the actual stacking device. The already partially stacked support is lowered layer by layer in order to adapt the level for stacking purposes. This is exploited since in this way already formed layers of the stack "slip downwards" and can be wrapped layer by layer below the stacking level, while stacking continues "above". This saves time. For this purpose, a film-wrapping device is integrated directly into the device. This has the advantage that the support with the formed stack does not have to be moved separately. Thus, after each time a layer is lowered, stabilization can be taking place. This means that even in the case of supports which are not actually stacked in a fully stable manner, a high level of stability in the stack can be achieved. This also considerably expands the options for stack formation with respect to the goods and the selectable succession.

Of course, as an alternative to the film-wrapping technique all other known stabilization options can be used. These include, for example, shrink-wrapping, nets and other expandable materials, hook-and-loop fasteners, and the like. During stacking itself, stabilization can be carried out by lateral walls disposed in a U-shape around the stacking site or support, so that it is possible to "stack against the wall". Both the lateral walls and also the rear lateral wall can be adjusted or moved vertically and/or horizontally with respect to the stacking site. Therefore, differently sized supports, etc., can be loaded and the walls serve as strippers in conjunction with intermediate plates. Depending on the package to be stacked, it may be necessary, in order to protect them or to increase stackability, to place layers, for example, of cardboard or paperboard, between, below or above the layers. For this purpose, the flat material can be stored and/or delivered in a suitable manner and laid down using suckers provided on the handling means. Both the supports (for example pallets) and also the layers (paper-boards) can be delivered and provided via a separate conveyor system. The receiving or transfer of the supports or layers can be effected with dedicated equipment.

In one embodiment, provision is made that an intermediate plate is provided at the level of the positioning conveyor above the support to be loaded. The intermediate plate provides a unified smooth surface for stack formation and permits further stacking in spite of a change of support. The intermediate plate is preferably divided in the middle and each part is formed to be able to be displaced to the side. In one variation, the first layer of a stack is formed on the intermediate plate, while the completely loaded support of the previous stacking process is exchanged therebelow for a new empty support. Therefore, the stacking process can be continued without interruption. If the first layer is formed and the new support present, the parts are moved to the side and the first layer transferred to the support lying therebelow on which further stacking is then carried out.

In an alternative embodiment, the complete stacking process takes place on the intermediate plate and this plate is formed in a height-adjustable manner for this purpose. This has the advantage that the transfer to the support takes place only after stacking and this support does not have to be "exchanged". In this way, the entire throughput of the device is increased. In addition, the possibly provided wrapping with stretch film can be carried out more easily. When the intermediate plate is moving apart or opening, the lateral stabilization walls serve as strippers, i.e., the intermediate plate moves to the side below the lower edges of the walls. There is an increasing requirement for the provision of the stacked package in so-called trolleys or wheeled containers. These can easily be loaded into lorries and unloaded and moved on site because they have wheels. In addition, they have lateral walls which permit stable stacking and good stabilization by means of stretch film so that transportation is also secure. However, these properties are associated with difficulties during automatic stacking.

It has been recognized in accordance with embodiments of the invention that automatic stacking is reliably achieved when the lateral walls of the trolley are kept at least vertical or even bowed outwards in a slightly inclined manner by a spreading device. The lateral walls in fact have the property of moving inwards towards one another. It has also proved to be the case that stacking onto trolleys can be facilitated if, for this purpose, a separate and possibly height-adjustable intermediate plate is provided which is disposed on the side of the stacking site or support remote from the positioning conveyor or can be introduced into the trolley from this side. Therefore, with the device in accordance with the invention it is possible to stack onto pallets, etc., or trolleys as desired alternately. The rear lateral wall can serve as a stripper during transfer of the fully assembled stacked stack onto the trolley by withdrawal of the further intermediate plate. In one embodiment, the rear lateral wall is additionally able to move vertically and/or in the direction of the positioning conveyor so that differently sized trolleys can be used.

This also may serve as an attachment point for the spreading device. The spreading device may consist of two pins disposed at the same height in the region of the expected lateral walls of the trolley and protruding from the lateral wall forwards into the trolley space, these pins being displaceable laterally to the outside for spreading purposes. The pins are preferably disposed for this purpose on a respective vertically-oriented rotary disc in the rear lateral wall. For the purpose of easy transportation and handling within the system, the trolleys are moved on transport pallets which can be handled like normal pallets.

BRIEF DESCRIPTION OF THE DRAWINGS

Further details of the invention will become clear from the following description of exemplified embodiments with the aid of the drawing in which:

FIG. 5 is a plan view corresponding to FIG. 2 from above;

FIG. 6 is a view corresponding to FIG. 2 after the first layer has been completed;

FIG. 7 is a view corresponding to FIG. 1 after further layers have been completed;

FIG. 9 is a schematic perspective view from one side of a further device for automatic multi-layer stacking onto pallets;

FIG. 10 is a schematic perspective view of the device of FIG. 9 from another viewing angle;

FIG. 11 is a schematic perspective view of the displacement means of the device of FIG. 9 as a package is being received;

FIG. 24 is a schematic perspective view of the device of FIG. 23 from another viewing angle, wherein the rear stabilization wall has been omitted for the sake of clarity;

FIG. 25 is an enlarged view of the device of FIG. 23 during spreading of the lateral walls of the trolley, and FIG. 26 is a detailed view of the mechanism for spreading the lateral walls of the trolley.

DESCRIPTION OF THE PREFERRED EMBODIMENT

Figure 1:
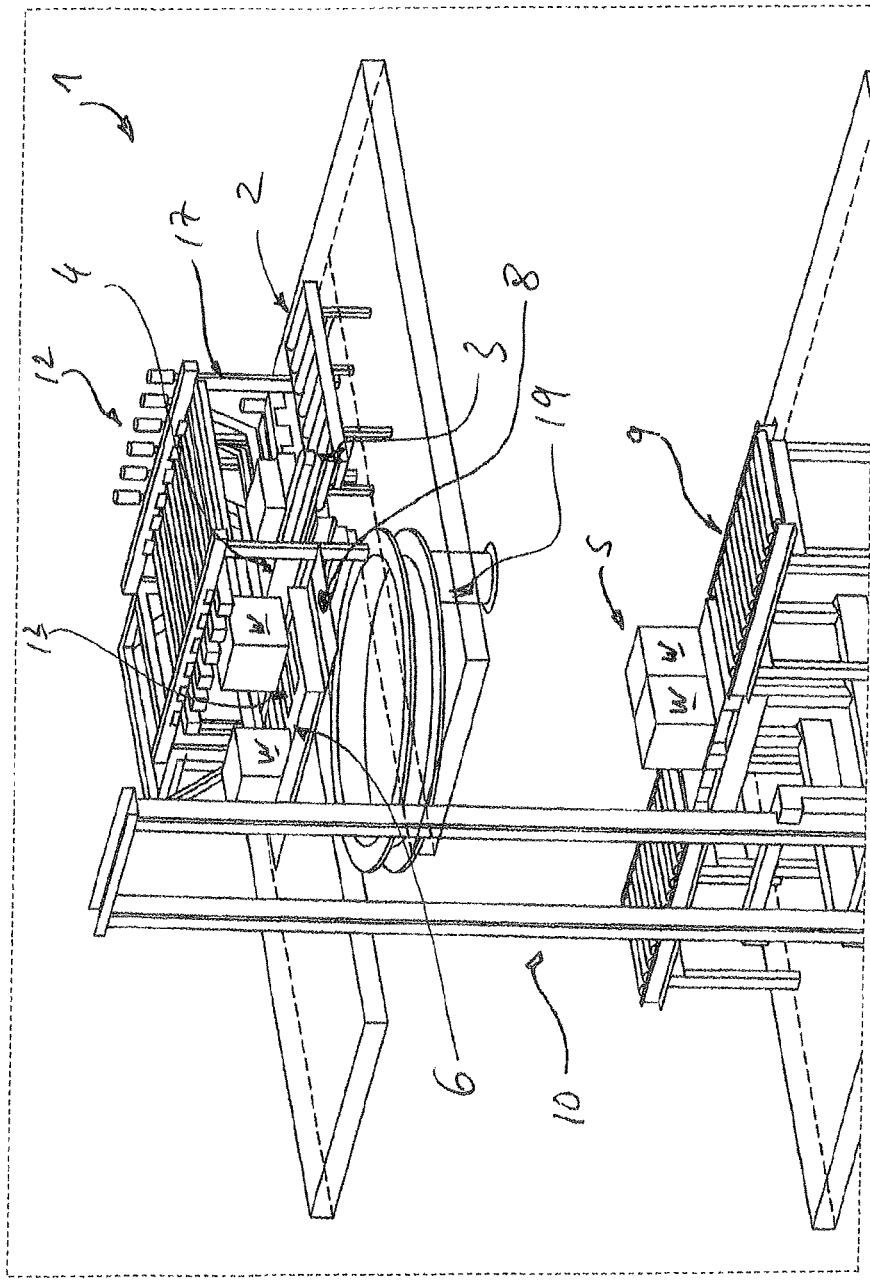
FIG. 1 is a schematic perspective view of a device for automatic multi-layer stacking onto pallets at the beginning of the formation of the first layer.
Figure 2:
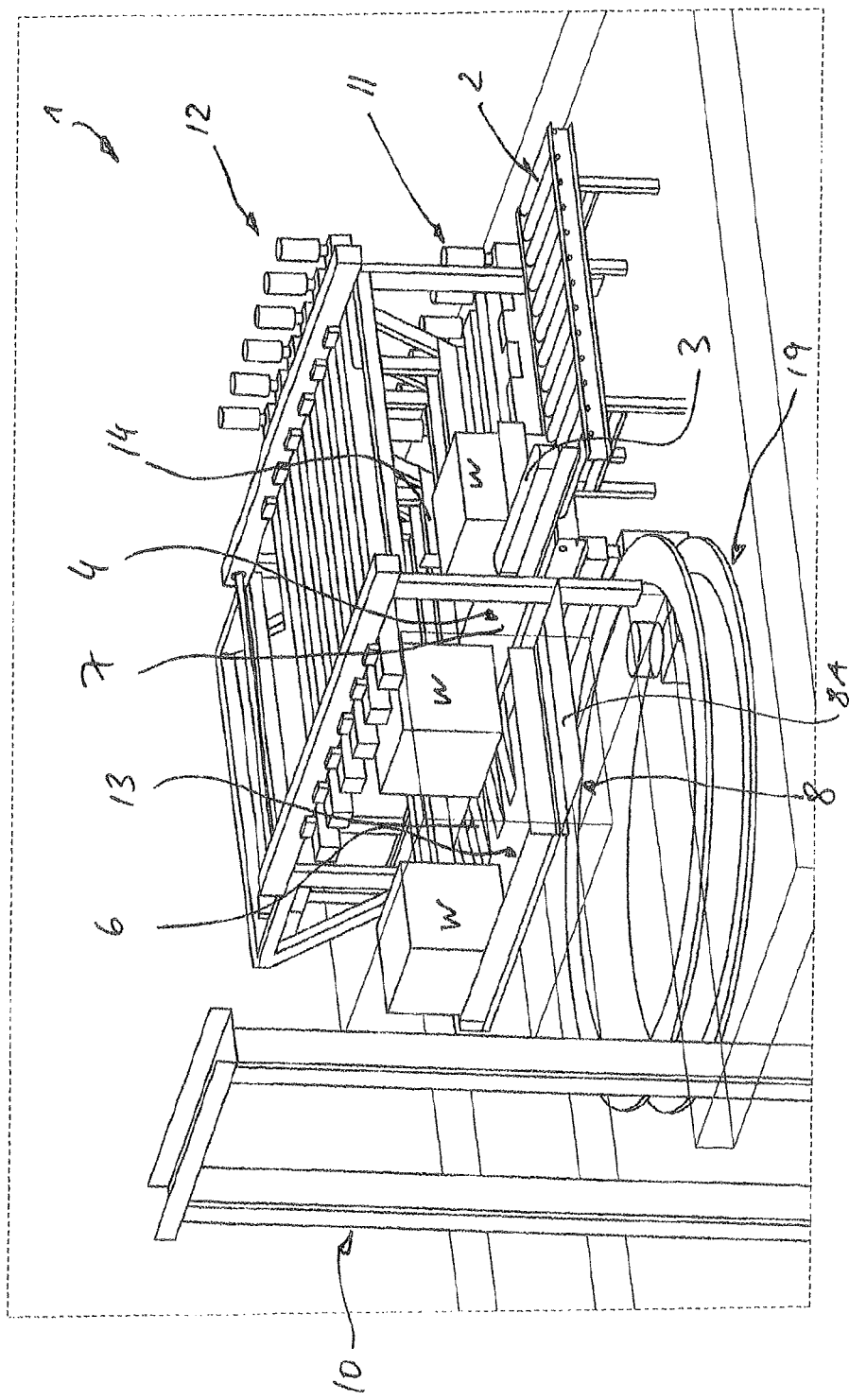
FIG. 2 is an enlarged schematic side view of the device of FIG. 1 in the region of the endless conveyor.
Figure 3:
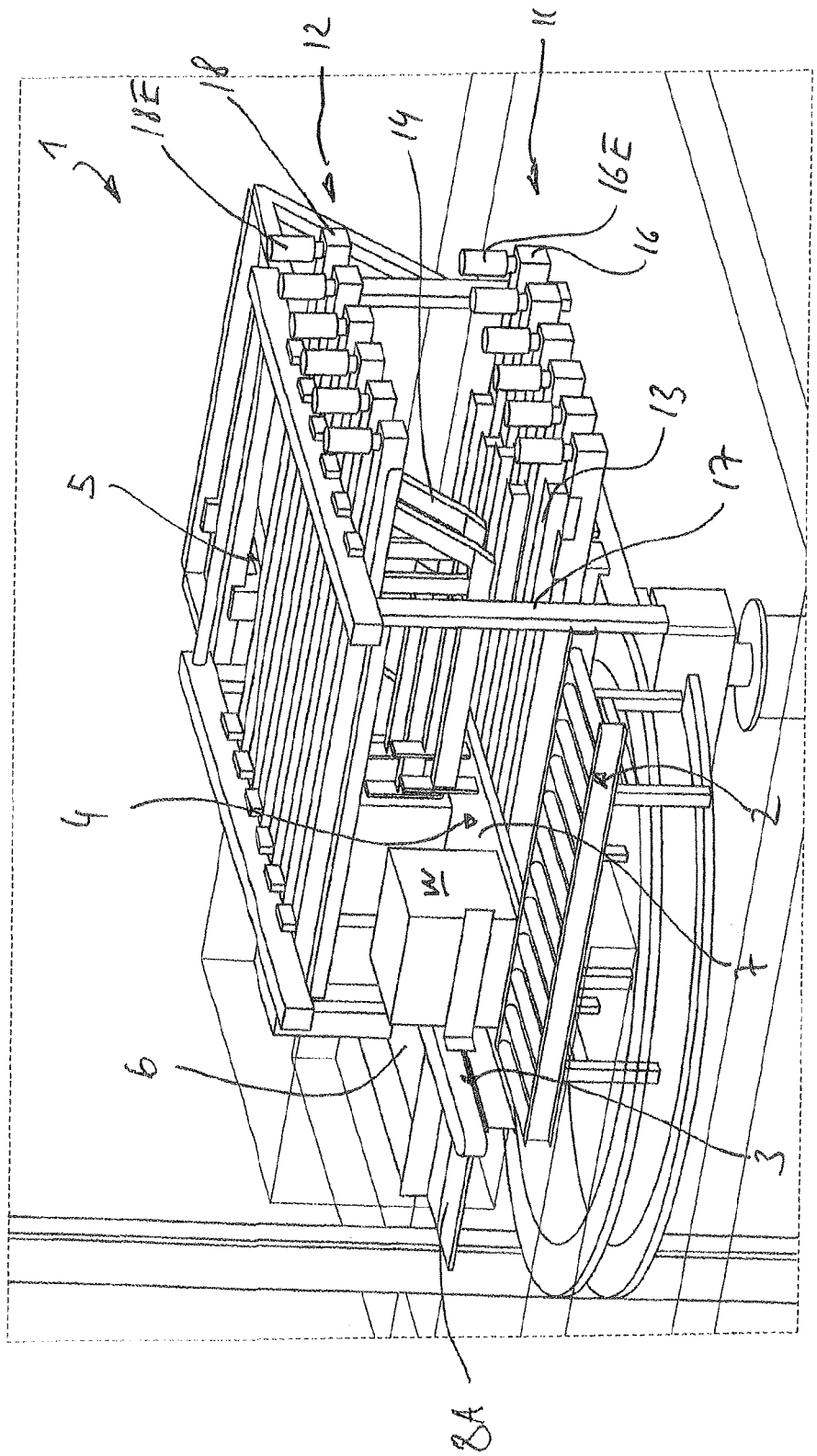
FIG. 3 is a view corresponding to FIG. 2 from another viewing angle.
Figure 4:
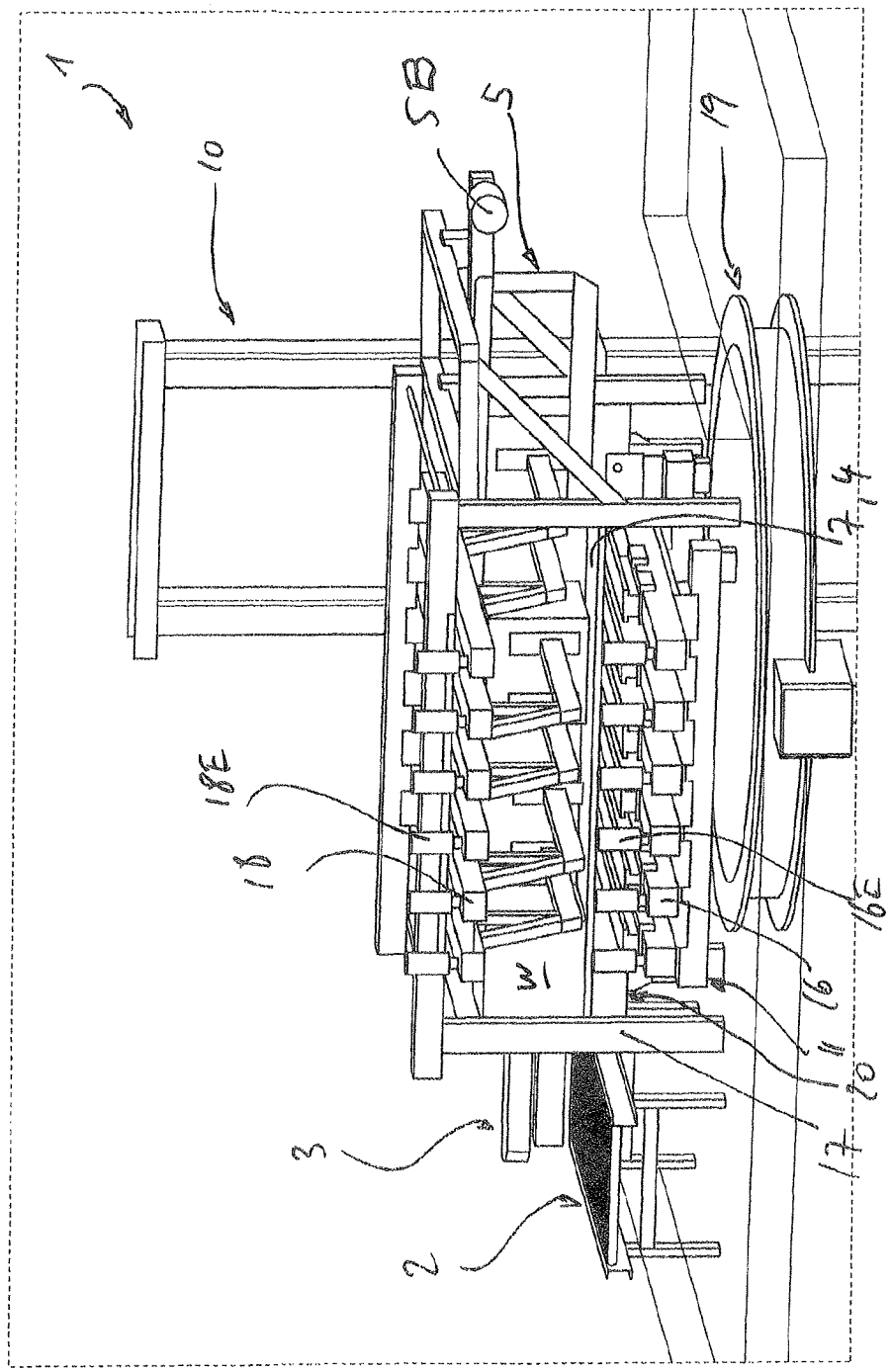
FIG. 4 is a view corresponding to FIG. 2 from still another viewing angle.

FIGS. 1 to 7 show a device, designated as a whole by 1, for automatic multi-layer stacking onto pallets P with package W of different dimensions in a predetermined spatial arrangement. This is therefore a device for "mixed-case" palletization. Of course, the device 1 can also just be used to palletize package W which are all the same. The device 1 includes a roller conveyor 2 as a supply conveyor which provides the separated package W in a succession, which is predetermined with the aid of a computer, from a store, not shown. At the end of the roller conveyor 2 a transfer device formed as a pusher 3 is disposed and turns the package W through 90 degrees and outputs them onto the subsequent positioning conveyor. The packages W are thus also oriented angularly so that they are oriented on the positioning conveyor 4 as far as their external shape will allow.

The positioning conveyor 4 is an endless conveyor in the form of a circulating conveyor belt. By means thereof, the packages W are positioned for conveyance in the X direction in order to adopt this coordinate of the later position in the stack. In order to precisely retain the positioning or to carry it out when the conveyor belt 4 is running, a stop means 5 (cf. FIG. 4) is provided which is moveably controlled in the X direction relative to the conveyor belt in order to "stop" the respective package. Driving is effected via a toothed belt (not shown) which is disposed on the linear axle 5B and has the stop means 5 suspended therein.

The positioning conveyor or the conveyor belt 4 is disposed horizontally (at the same level) and along one side of the site 6 for stack formation. The support P (pallet) to be loaded is disposed at this point in the conventional manner (cf. FIGS. 6 and 7). However, as can also be seen, this is not the case during formation of the first layer of a stack.

At the level of the upper run 7 of the endless conveyor 4 above the support P to be loaded, an intermediate plate 8 is provided at the site 6. The intermediate plate 8 is divided in the middle and each part 8A, B is formed to be displaceable towards the side (in the X direction) such that the first position of a stack on the intermediate plate 8 is formed while the completely loaded support P of the previous stacking process is exchanged therebelow for a new empty support P. The stacking process can thus be continued without interruption. If the first layer is formed and the new support P is present, the parts 8A, B are moved to the side (cf. FIG. 6) and the first layer is thus transferred to the support P lying thereunder, on which further stacking is then carried out (cf. FIG. 7).

An appropriate roller conveyor 9 is provided below the stacking site 6 in order to supply empty pallets or to carry away stacked pallets. The respective pallet P is received from the roller conveyor by a lifting and lowering unit 10 for lifting and lowering the support P in the Y direction and is moved upwards to the stacking site 6. The lifting and lowering unit 10 is also responsible per se for the level adaptation during stacking, it thus carries out a lifting or a lowering movement if necessary during stacking of a package W and also carries out the adaptation of the balance of the layers at the beginning of a new layer. From the conveyor belt 4, the respective package W is thus pushed off to the desired position in the stack laterally into the site 6 onto the intermediate plate 8 (first layer) or the pallet P (further layers) in the Z direction.

For the purpose of this displacement of the packages W to the predetermined position in the stack S, the device comprises a pushing plate row 11 and a pusher row 12, i.e., in each case a plurality of individual pushing plates 13 and individual pushers 14 which are disposed next to each other horizontally and along the side of the stacking site 6 or the pallet P. The pushing plates 13 engage through between the upper run 7 and the lower run 20 of the endless conveyor and receive the package W pushed off the conveyor belt by the pusher 14. The pusher and the pushing plate then travel together to the desired position and the pushing plate 13 is withdrawn while the pusher 14 remains stationary to retain the package W. The package W is therefore positioned. The pushing plates 13 taper flat at the front (cf. FIG. 2) so that positioning can be effected in the most precise manner possible. The pushing plates 13 are each formed as flat strip-like plates which can move horizontally and along the side of the stacking site 6 and transversely thereto, the plates tapering thinner in the direction of the stacking site 6.

The pushing plates 13 are suspended on the side of the endless conveyor 4 opposite the support and are disposed in parallel and next to one another. They are each able to move back and forth in the manner of a carriage on a linear axle 16 oriented in the Z direction. Driving is effected for each axle by an electric motor 16E and a toothed belt (not shown) which is disposed on the linear axle and has the carriage or pushing plate 13 suspended therein. The pushing plate row 11 therefore virtually forms a selected widening of the endless conveyor 4 into the stacking site 6. The pushers 14 are disposed horizontally and along the side of the stacking site 6 or of the support P along the endless conveyor 4 and in alignment with one another and are formed to be able to travel independently of one another. They are disposed on the side of the endless conveyor opposite the support and are inoperative at that location in order to extend over the conveyor belt 4 to push off packages.

The pushers are also disposed, like the pushing plates, over the entire length of the stacking site 6 or the pallet P and are attached to a frame 17 extending above the endless conveyor. At that location, they are each able to move back and forth in a carriage-like manner on a linear axle 18 oriented in the Z direction. Driving is effected for each axle via an electric motor 18E and via a toothed belt (not shown) which is disposed on the linear axle and has the carriage or the pushers 14 suspended therein. Both the stop means 5 and also the pushers 14 extend downwards from the respective linear axle to a level only just above the surface of the conveyor belt 4 and at that end have a foot with an enlarged surface, in order to handle the packages W better and more securely.

Below the stacking site 6, a unit 19 for wrapping the formed stack S with a film is provided. Wrapping is effected in layers gradually during stacking or after stacking of a layer. The support P with the already formed layers of the stack S is gradually lowered down by the lifting and lowering unit 10 and thus travels through the annular unit 19 to be wrapped. If the whole stack S is finished, the stack S on the pallet P is moved downwards and transported away on the roller conveyor 9. At the same time, the intermediate plate 8 is closed and further stacking is carried out thereon to form the next stack of the next order. In parallel therewith, as already described above, a new empty pallet P is "loaded".

All in all, for the purpose of automatically stacking packages W onto a pallet P in a predetermined spatial arrangement to form a stack S, the succession and spatial position of the packages W on the pallet P are determined with the aid of a computer in order to erect a stack S with the aid of the order forming the basis thereof. The packages W are then procured individually from a store, etc., without auxiliary means (trays, etc.) in a predetermined succession required for this purpose by means of the supply conveyor 2. The packages W to be loaded are then transferred from the supply conveyor 2 by the transfer device or pusher 3 onto the endless conveyor 4. By means of the endless conveyor, the stop means 5 and the pusher row 12 and pushing plate row 11, the respective package W is transported to the predetermined spatial position on the pallet P (or the stacking site 6 or intermediate plate 8) in the stack being formed. Depending on requirements, the pallet P is lowered or raised in the Y direction by the corresponding unit 10.

Figure 8A:
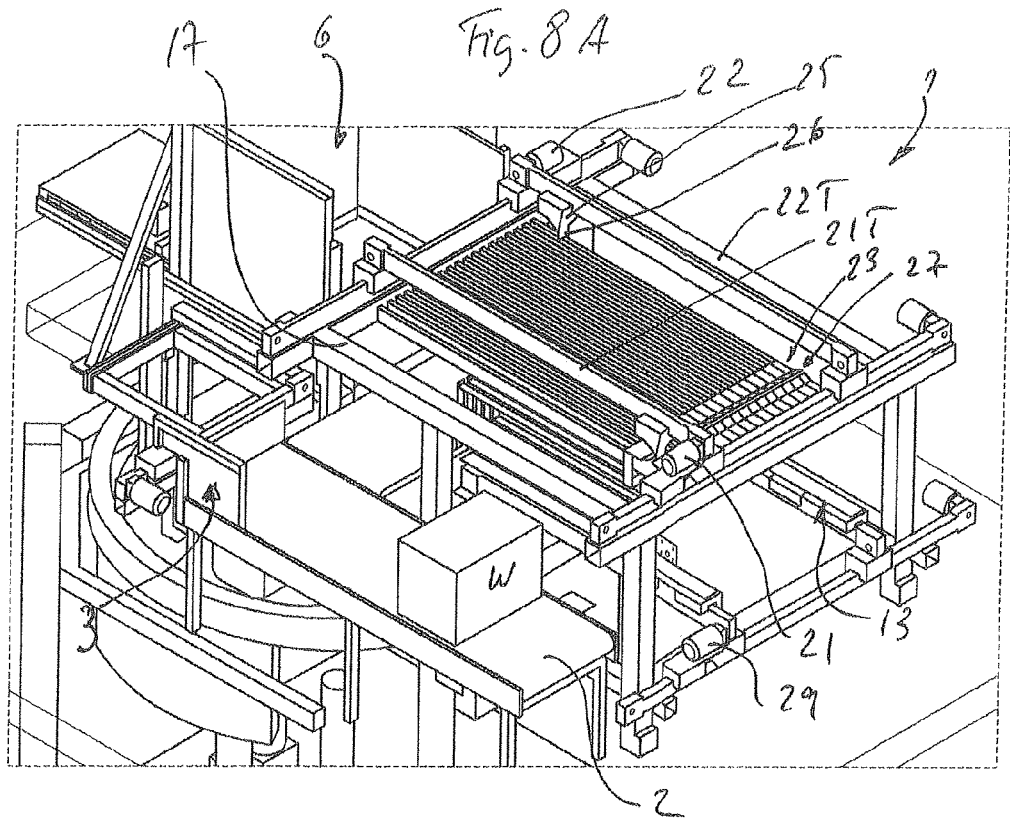
FIG. 8A is a schematic perspective view of a variation of a device for automatic multi-layer stacking.
Figure 8B:
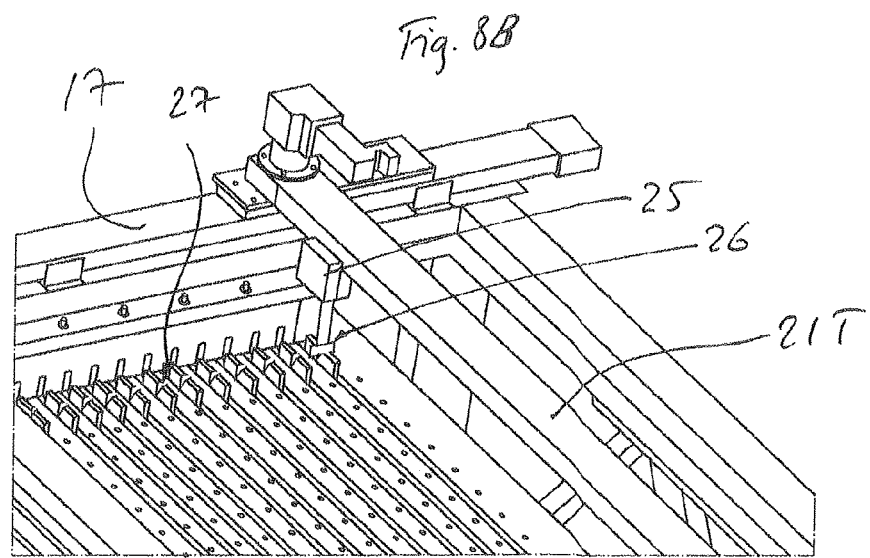
FIG. 8B is an enlarged detailed view of the common drive of the individual pushers.
Figure 12:
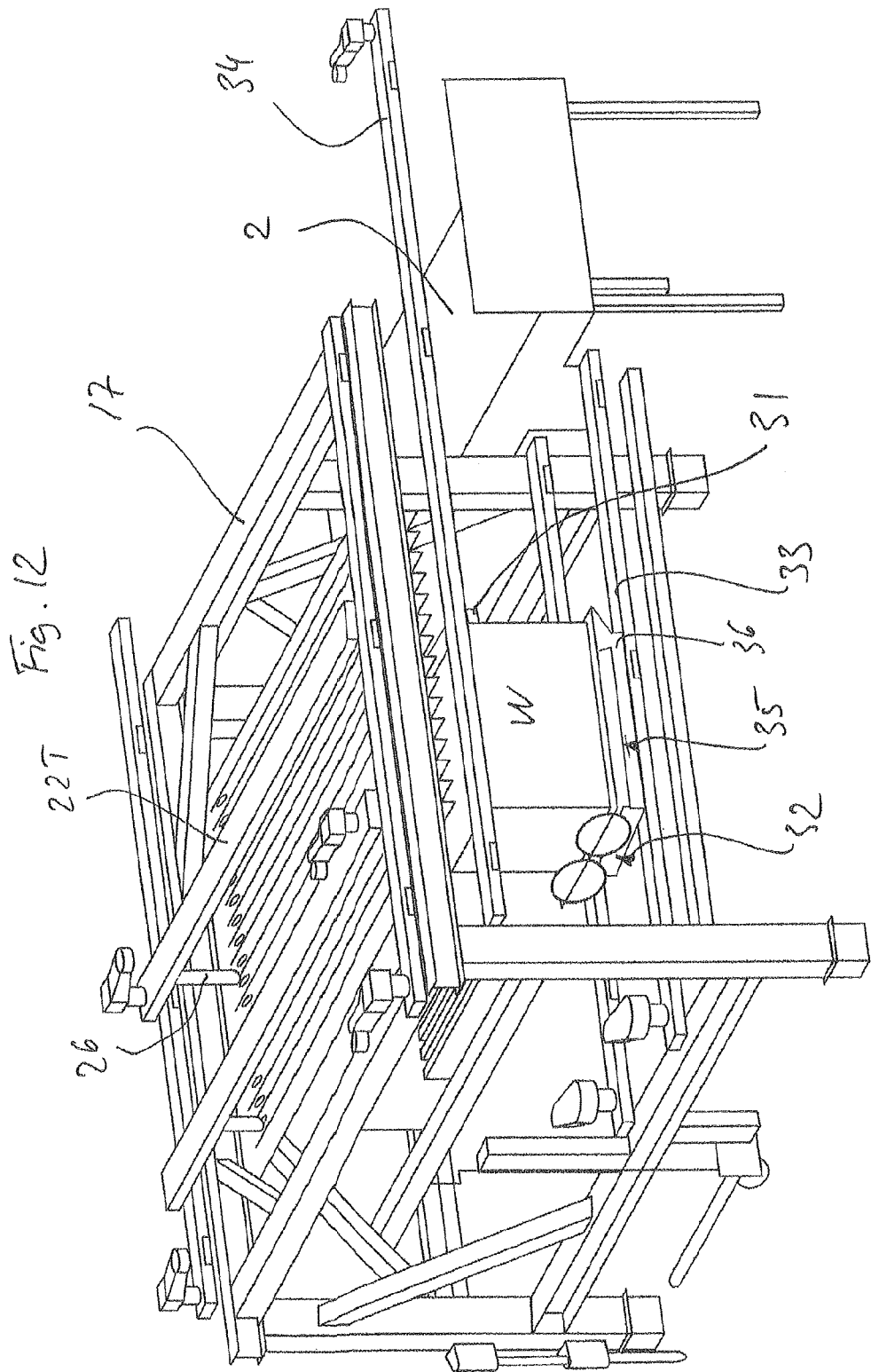
FIG. 12 is a schematic perspective view of the displacement means of the device of FIG. 9 during transportation of the package in the X direction.
Figure 13:
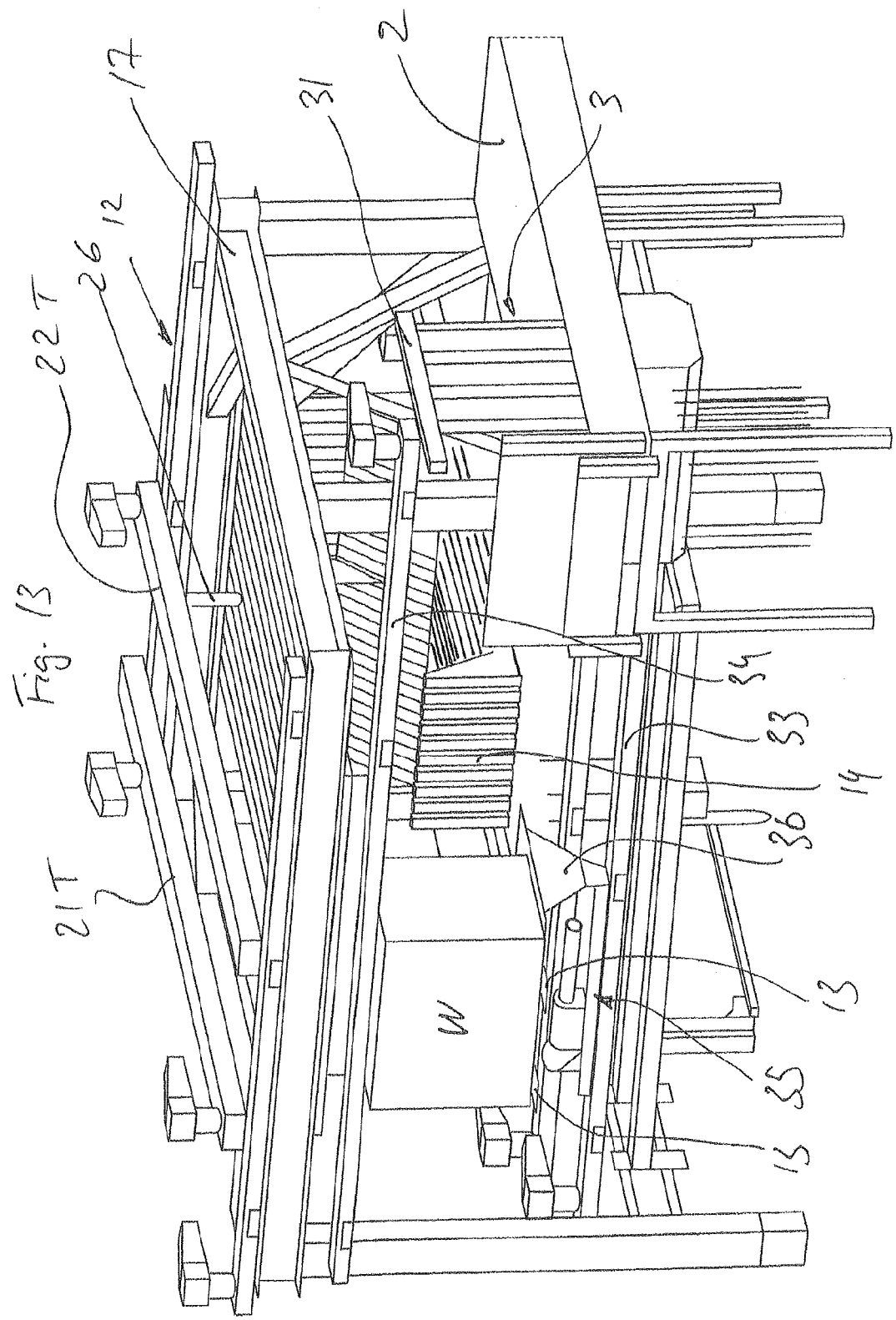
FIG. 13 is a schematic perspective view of the displacement means of the device of FIG. 9 at the start of transportation of the package in the Z direction.

In FIGS. 8A and 8B, an alternative variation of the above-described device is illustrated which essentially differs therefrom in that the individual pushers of the pusher row do not have their own drives and that no pushing plate row is provided. Therefore, only these differences will be discussed hereinunder. In this variation, the individual pushers have two common drives 21, 22 which can be coupled as selected to a specific individual pusher in order to drive same. For this purpose, the drives 21, 22 are able to travel in the X direction on the frame 17 above the individual pushers by means of a cross-member 21T, 22T and can be coupled to the drive carriage 23 of the individual pushers 14. The drive 21, 22 has in each case an actual drive block 24, 25 which can move in the Z direction analogously to the above-mentioned embodiment of the pushers. In order to drive the respective individual pusher 14, the drive block 24, 25 has a coupling lug 26 pointing in the direction of the drive carriages 23, which lug engages into a groove 27 in the drive carriage 23, which extends transverse to the X direction. In order to drive a specific individual pusher, the drive 21 or 22 is moved, depending on the individual pusher, by means of the cross-member in such a way that the corresponding coupling lug 26 engages into the groove 27 of the respective drive carriage 23. Then, the drive block 24 or 25 is moved and carries the drive carriage 23 or the individual pusher 14 with it in the Z direction.

The individual pushers are thus suspended from a frame on which they are able to move in the Z direction towards the stack (or away therefrom). To this end, they are approached by a carriage or cross-member disposed above and extending transverse thereto, i.e., in the X direction, which carriage or cross-member supports the drive, wherein a coupling or carrier element produces the operative connection between the drive and individual pushers.

This can be seen in more detail in FIG. 8B. It is also possible to see that the carrier element (coupling lug 26) hangs down in a leaf or strip-like manner from the drive or its travel cross-member 21T, 22T and engages into an upwardly open groove 27 on the drive carriage of the adjoining individual pusher(s) 14, for which purpose the carrier 26 has a corresponding width so that it can engage by appropriate positioning either into the groove 27 of an individual pusher or into the two grooves 27 of adjoining individual pushers 14.

A further difference in this variation is the use of only two pushing plates 13 which can now be moved in the X direction along the stacking site 6 via a drive 28, 29 so that the respective pushing plate can be positioned corresponding to an individual pusher. For this purpose, the respective linear axle of the pushing plate is formed to be able to move analogously to a cross-member. It is also possible to control both pushing plates together so that a package W lies on both pushing plates at the same time. Clearly this can be combined with corresponding control and use of, for example, two individual pushers.

FIGS. 9 to 26 show a further device 30 in accordance with the invention which, in contrast to the devices mentioned above, has, as a positioning conveyor, a travelling carriage or shuttle for transportation of the packages W in the X direction along the stacking site 6 using the variation of the pusher row/pushing plate arrangement of FIGS. 8A, B. Furthermore, in conjunction with this embodiment, further details of the embodiment of the stacking site (stacking aids, intermediate plates) etc. are described. The travelling carriage 35 thus replaces the endless conveyor 4 for X direction positioning of the packages W.

The travelling carriage 35 receives individual packages W from the supply conveyor 2. For this purpose, the transfer device 31 pushes the packages from the supply conveyor 2 onto the travelling carriage 35.

The travelling carriage 35 has a moveable stop 32 on the remote side in order to prevent falling and to permit precise positioning. In order to ensure that the package W does not fall off during acceleration of the travelling carriage 35, the transfer device 31 is moved in synchronism with the travelling carriage 35 in the X direction so that the respective package is transported on the travelling carriage 35 clamped in between the stop 32 and the transfer device 31 (cf. FIG. 12). For movement in the X direction, rails 33 are provided on which the travelling carriage 35 is moveable between the stacking site 6 and pusher/pushing plate unit. In parallel with and above this a corresponding rail 34 for synchronous movement of the transfer device 31 is disposed. The rails 33, 34 are also attached to the frame 17. The travelling carriage 35 is formed with a C-shaped frame 36 (cf. FIG. 18) so that then the at least one pushing plate can engage through between the limbs of the "C" so that there is no mutual obstruction. This also makes it possible for the travelling carriage—after completed "transfer" of the package W to the pushing plate prior to termination of the stacking process—to travel back in order to receive the next package from the supply conveyor 2 (cf. FIGS. 12 to 17).

As shown in FIGS. 13 to 16, the travelling carriage 35 thus travels with a package W clamped in by the folded-up stop 32 and transfer device 31, to the respective pre-calculated X position on the rails 33. At the same time the cross-members 21T, 22T for the individual pushers travel from the left and from the right in the X direction into the required position for interaction with the drive carriages 27 of the individual pushers 14, wherein the carrier 26 engages into the respective groove 27. The pushing plates 13 are also positioned in the X direction.

Figure 17:
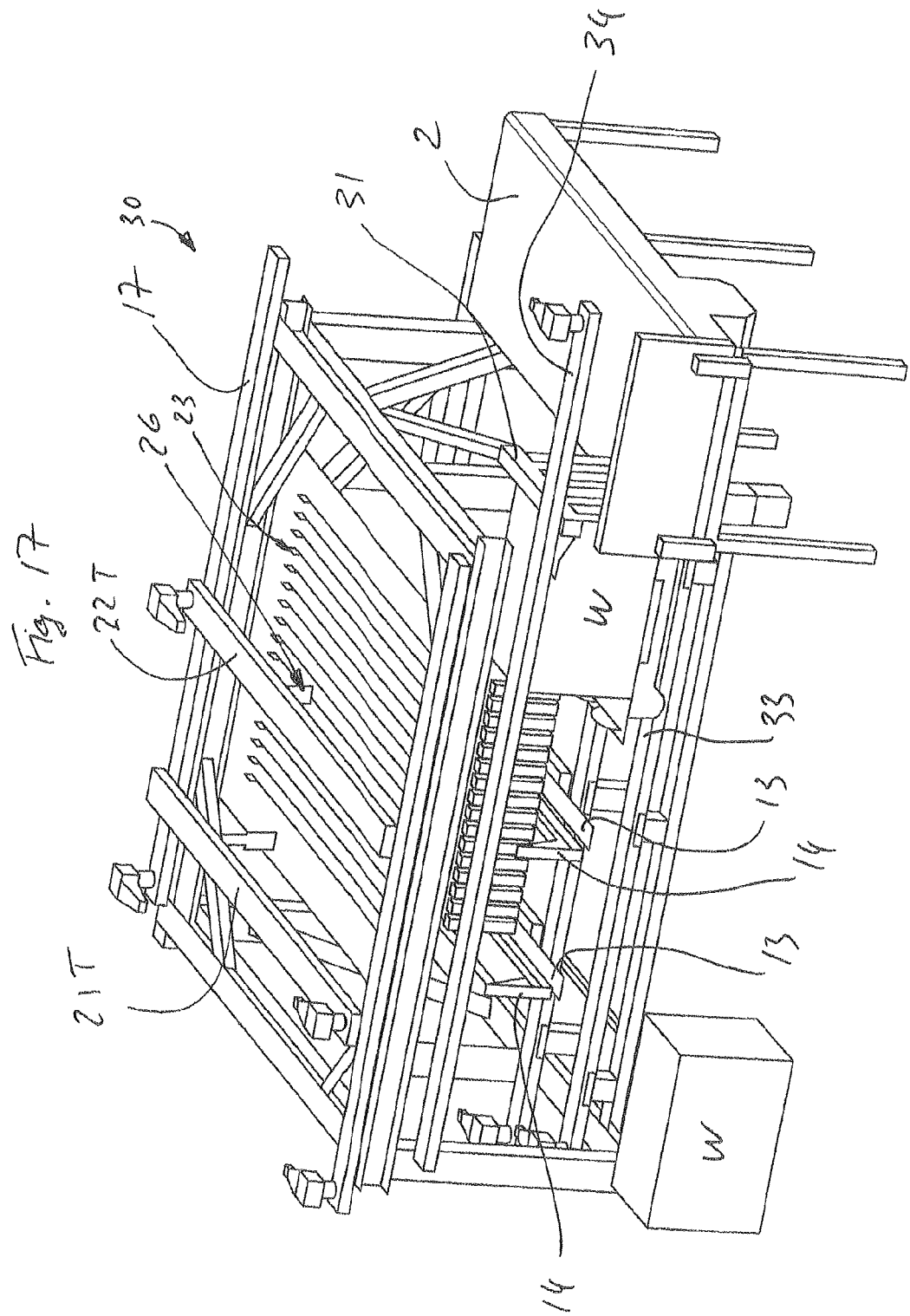
FIG. 17 is a schematic perspective view of the displacement means of the device of FIG. 9 after the end of transportation of the package in the Z direction.
Figure 18:
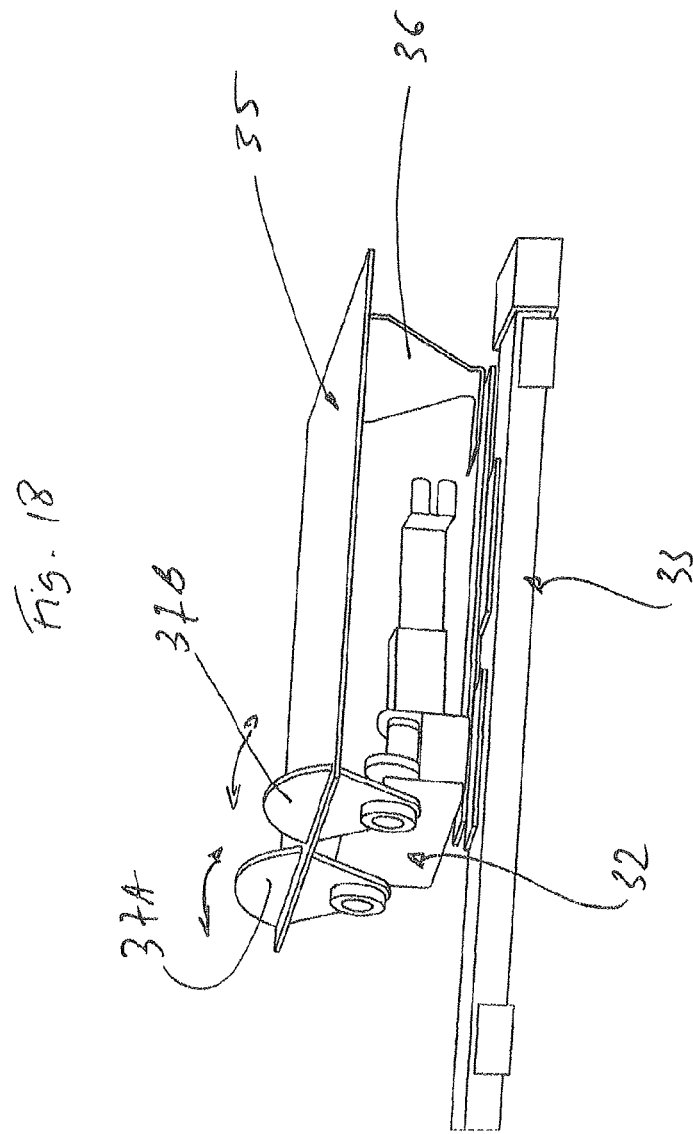
FIG. 18 is an enlarged detailed view of the travelling carriage of FIGS. 11 to 17.
Figure 19:
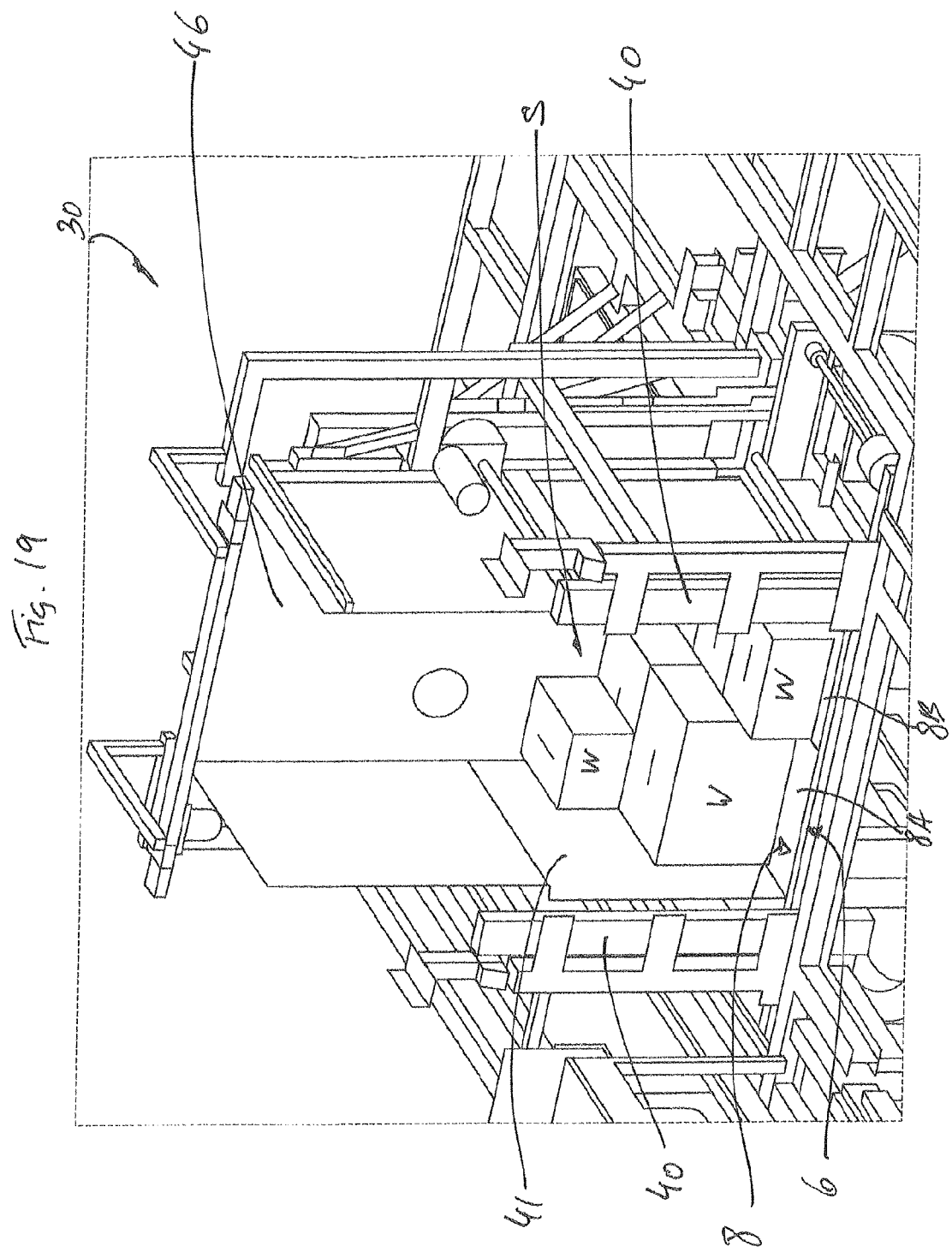
FIG. 19 is a schematic perspective enlarged view of the device of FIG. 9 in the region of the stacking site at the end of the stacking process.
Figure 20:
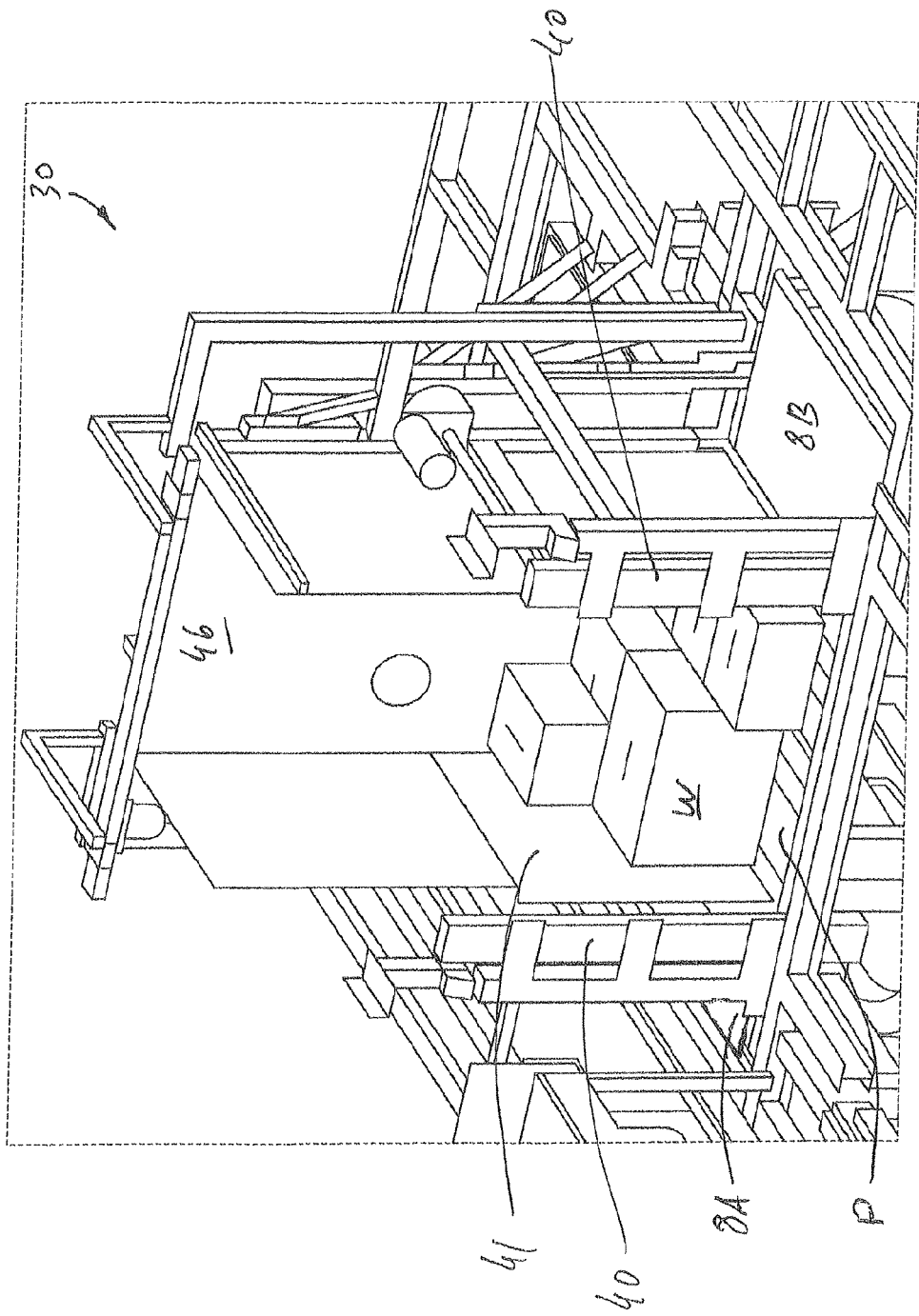
FIG. 20 is a schematic perspective enlarged view of the device of FIG. 19 in the region of the stacking site during transfer of the stack from the intermediate plate to a pallet.
Figure 21:
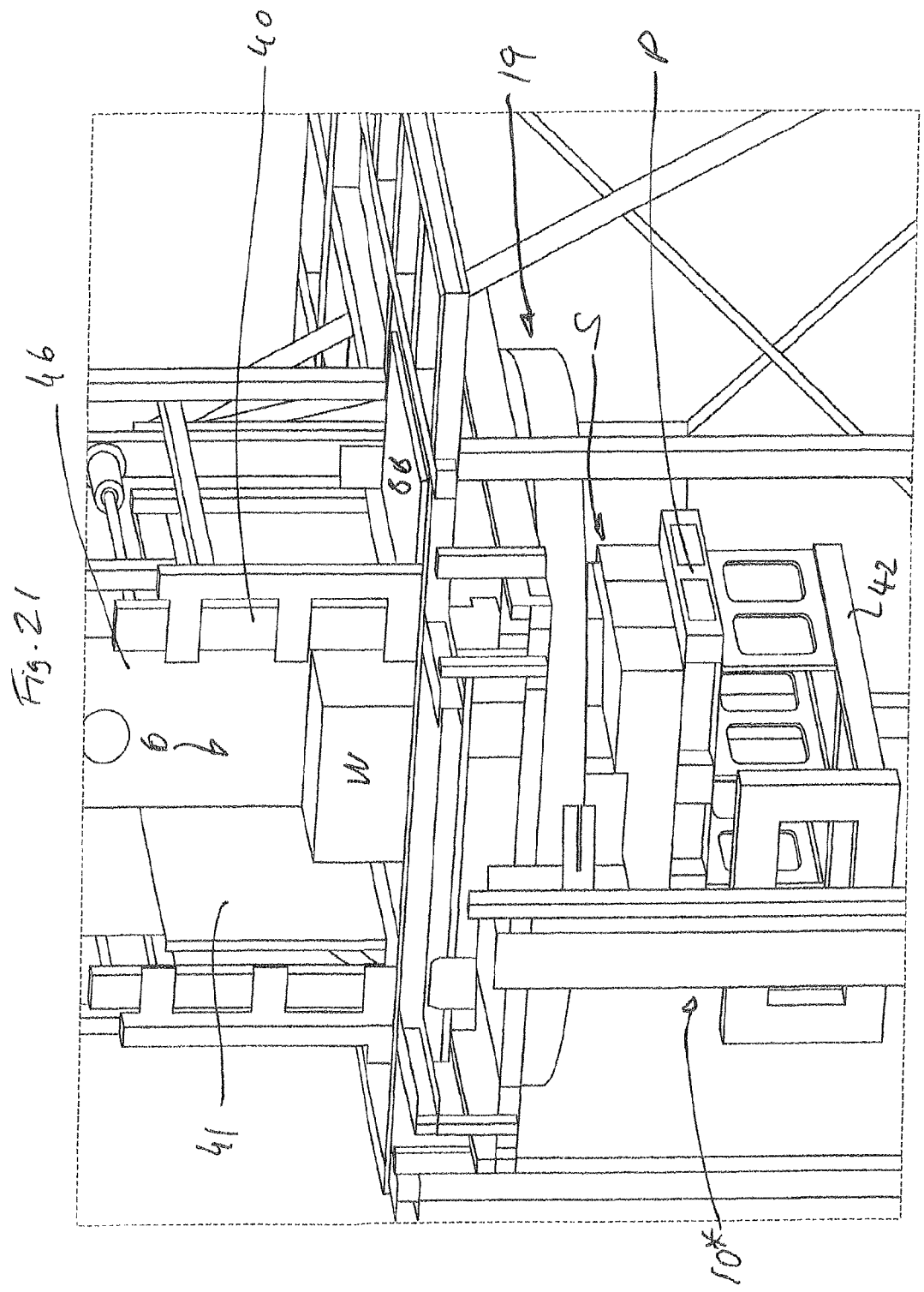
FIG. 21 is a schematic perspective enlarged view of the device of FIG. 19 in the region of the stacking site during lowering of the stack.
Figure 22:
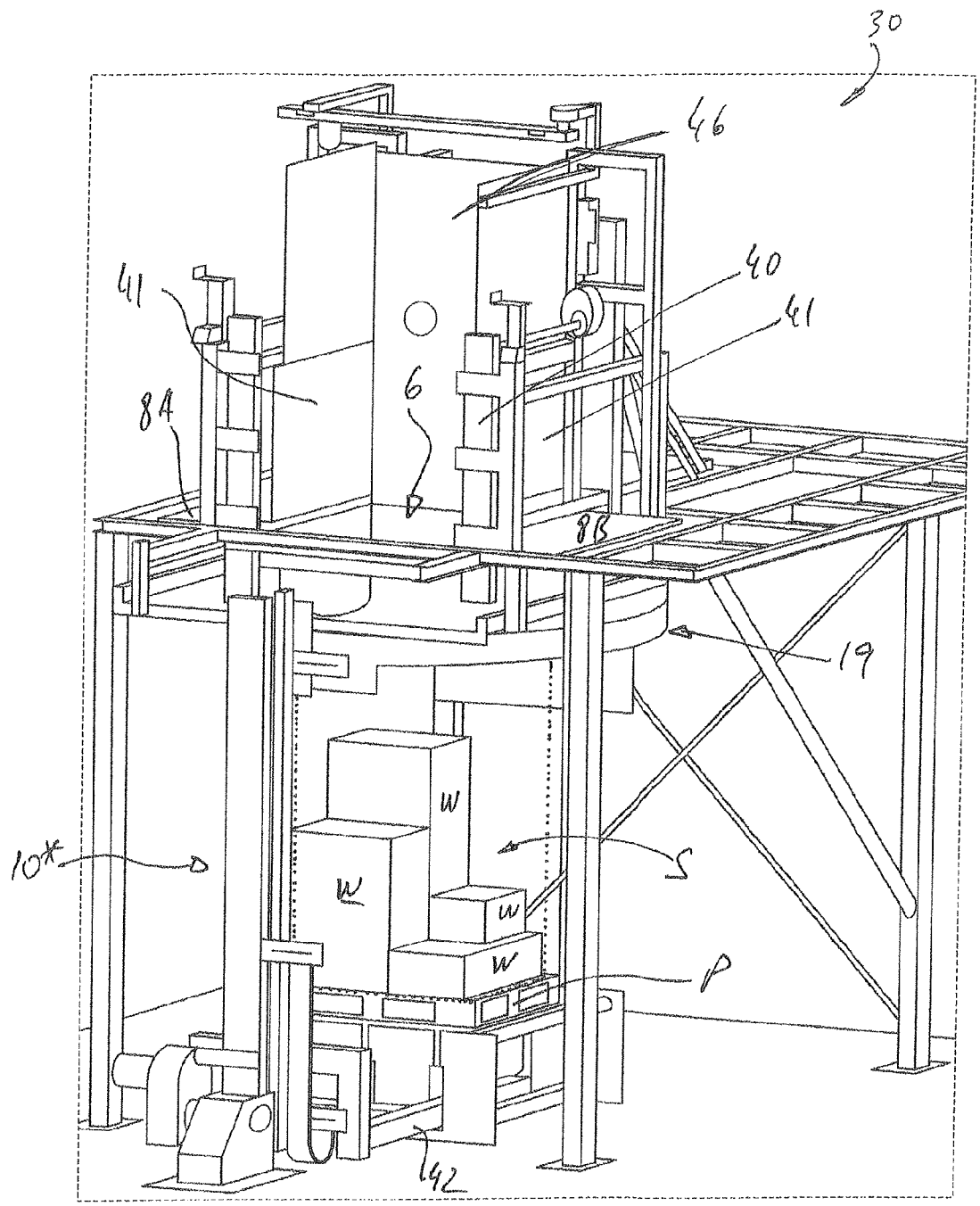
FIG. 22 is a schematic perspective enlarged view of the device of FIG. 19 in the region of the stacking site during wrapping of the stack with film and onward transportation.
Figure 23:
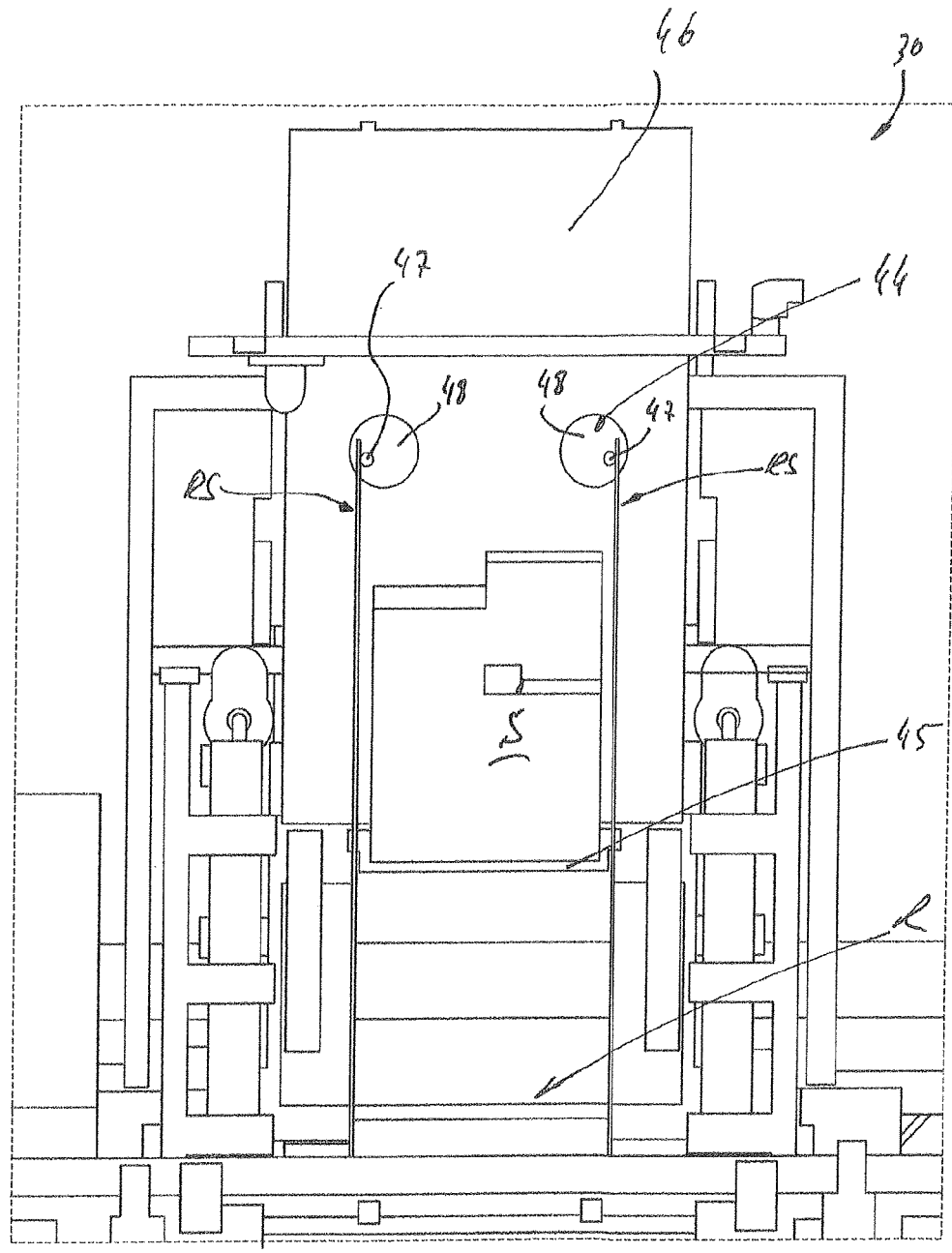
FIG. 23 is a schematic perspective view of a device for automatic multi-layer stacking onto trolleys in the region of the stacking site during stacking.

Then, as described, the pushing off action from the travelling carriage 35 (positioning conveyor) by the individual pushers, in this case two of them, onto the pushing plates, in this case also two of them, takes place, for which purpose the drive block 24, 25 travels along the cross-member in the Z direction and thus takes the respective individual pusher 14 with it. Accordingly, the two pushing plates 13 are extended in the Z direction in order to receive the package W from the travelling carriage 35, wherein they can "engage through" the travelling carriage 35 by reason of the C-shaped frame 36. As soon as the package W is resting completely on the pushing plates, the stop 32 is folded down (FIGS. 15 and 16) and the travelling carriage 35 can travel back for receiving purposes (FIG. 17). The stop 32 is formed by two stop discs 37A, B which can rotate counter-clockwise or clockwise. The stop disc 37A is pivoted downwards or folded down counter-clockwise and the stop disc 37B is pivoted downwards or folded down clockwise from the upright position confining the package W so that the travelling carriage 35 is free.

Figure 14:
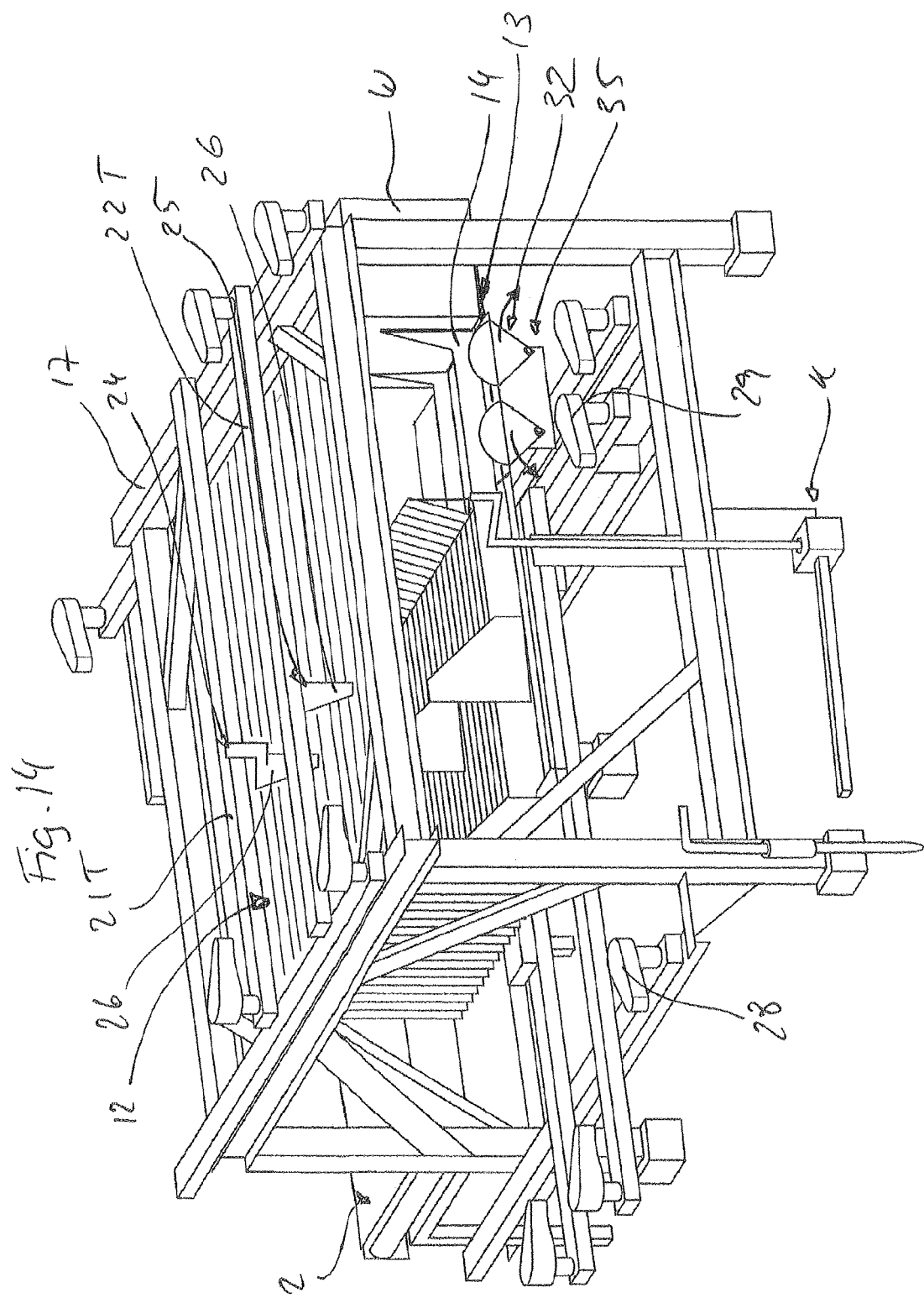
FIG. 14 is a schematic perspective view of the displacement means of the device of FIG. 9 at the start of transportation of the package in the Z direction from another viewing angle.
Figure 15:
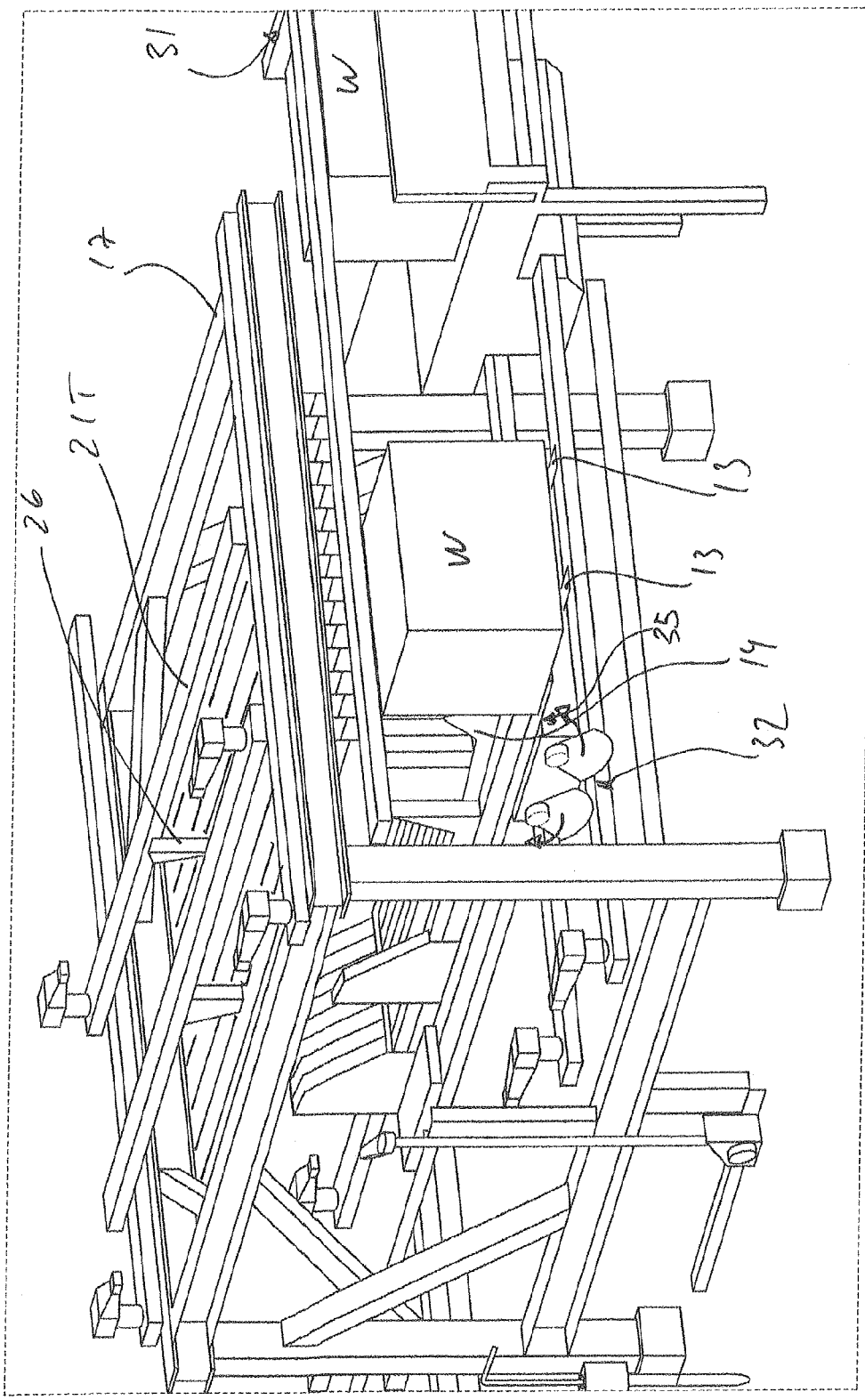
FIG. 15 is a schematic perspective view of the displacement means of the device of FIG. 9 during further transportation of the package in the Z direction.
Figure 16:
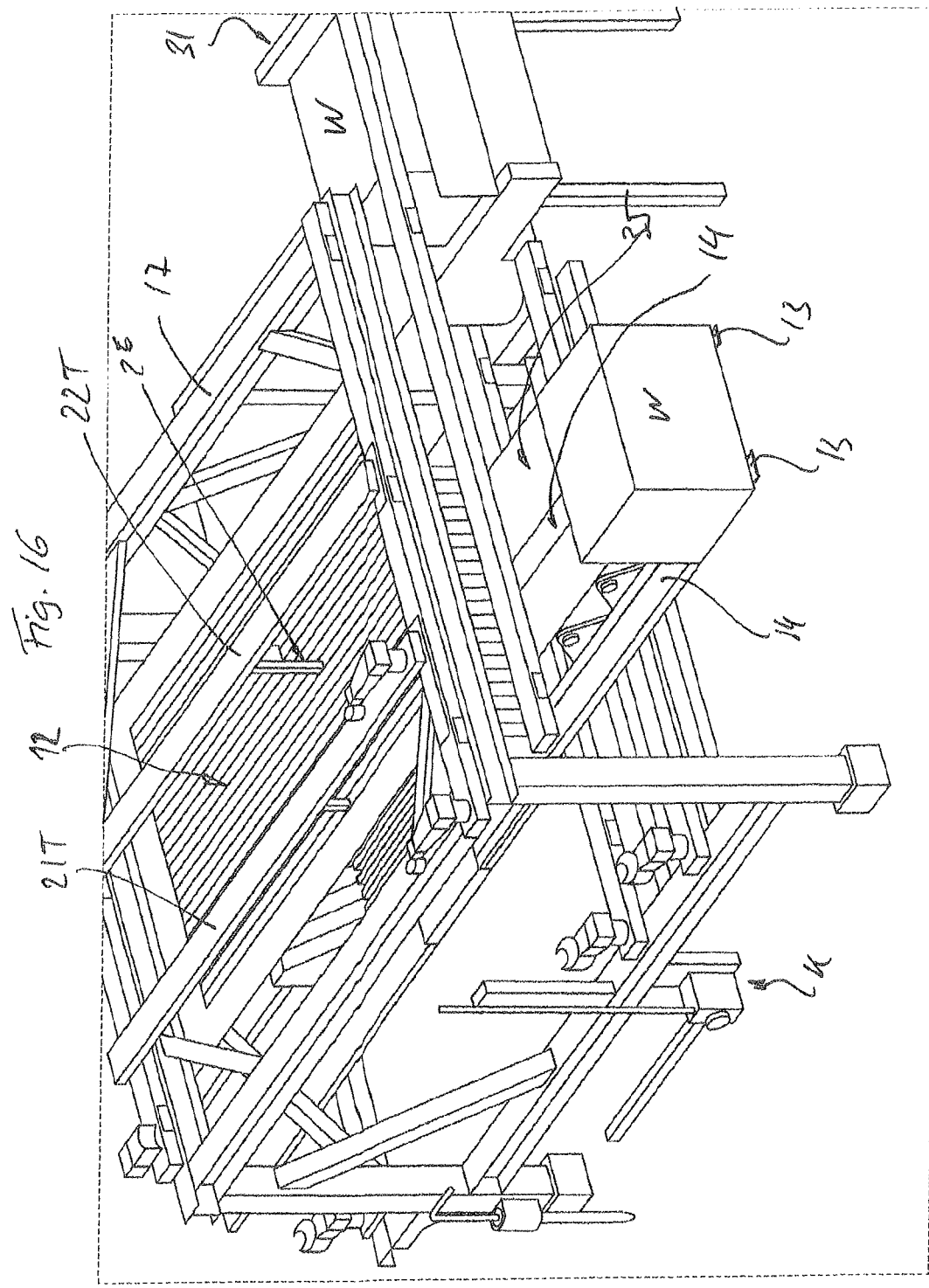
FIG. 16 is a schematic perspective view of the displacement means of the device of FIG. 9 at the end of transportation of the package in the Z direction.

FIG. 14 also shows a hand-operated crank K which drives the mechanism in order to permit or facilitate manual intervention, for which purpose the frame 17 (together with the unit consisting of the pusher and pushing plates as well as the positioning conveyor etc.) is moved away from the stacking site 6. In FIGS. 19 to 22, the stacking site 6 is shown in detail during stacking or during termination of stacking in the case of the device 30.

In contrast to the embodiment in FIGS. 1 to 7, the intermediate plate 8 not only serves to form the first layer of the stack S but the entire stack S. This is completely transferred to the waiting pallet P only after completion, wherein the lateral walls 41 serve as strippers. In order to ensure that this functions, the intermediate plate 8 or its parts 8A, B is suspended from a lifting frame 40 in a height-adjustable manner so that after completion of a layer this intermediate plate can be lowered in each case so that the stack level is at the height of the positioning conveyor. If the stack S is complete, the parts 8A, B of the intermediate plate 8 are moved towards the side below the edge of the lateral walls 41 (in the X direction), wherein the packages or the stack remains in the stacking site 6 and comes to rest on the waiting pallet P after complete removal of the intermediate plate 8 (cf. FIGS. 19 and 20). The pallet P with the stack S loaded is lowered further and passes through (as above) a wrapping unit 19 for wrapping with stretch film for stabilization purposes (cf. FIGS. 21 and 22). At the same time, the intermediate plate 8 was closed and a new stack formation can be commenced.

Then, the pallet with the stack is transferred or unloaded from the fork-like support 42 of the lifting and lowering unit 10* onto a roller conveyor 9 for onward transportation. The lifting and lowering unit 10* corresponds to the greatest possible extent to that described above but is in this case only a one-beam lifter. A new empty pallet for the new stack is then picked up and lifted into the waiting position below the intermediate plate.

FIGS. 23 to 26 show a schematic perspective view of the device just mentioned for automatic multi-layer stacking, wherein in this case a trolley R is disposed in the region of the stacking site 6 during stacking. The device 30 is thus suitable not only for the loading of pallets P but also for the loading of trolleys R. For this purpose, the trolleys R are supplied or onwardly transported by the same conveyor 9 as the pallets. For this purpose, the trolleys R are disposed on support pallets 43 (cf. FIG. 24) which can be handled like normal pallets. The trolleys R are also moved by the lifting and lowering unit 10* into the stacking site 6 from below.

In order to spread the lateral walls RS of the trolley R apart, a spreading device 44 is provided which holds the lateral walls RS at least vertically and even bowed outwards in a slightly inclined manner during stacking. The lateral walls RS in fact have the property of moving inwards towards one another. Since the lateral walls RS of the trolley R correspond to the parts 8A, B of the intermediate plate, and use thereof is therefore not possible, there is a separate and height-adjustable intermediate plate 45 for stacking onto trolley R, which intermediate plate is disposed on the side of the stacking site 6 remote from the positioning conveyor 2. After spreading of the lateral walls RS it is introduced, from this side, in a carriage-like manner into the trolley R in the Z direction by means of a drive 51. The intermediate plate 45 is suspended from a lifting frame 50 for height adjustment analogously to the intermediate plate 8. Then, as before, the stack S is formed by laying the packages W on the intermediate plate 45.

The rear lateral wall 46 (omitted in FIG. 24 for the sake of clarity) serves as a stripper during transfer of the completely stacked stack onto the trolley R by withdrawal of the further intermediate plate 45. The rear lateral wall 46 is also height-adjustable in order to "join in with" the lifting or lowering of the intermediate plate 45, and can move in the direction of the positioning conveyor 2 or of the stacking site 6 (Z direction) so that differently sized trolleys can be used. The rear lateral wall 46 also serves as an attachment point for the spreading device. The spreading device 44 consists of two pins 47 disposed at the same height in the region of the expected lateral walls of the trolley R and protruding from the lateral wall forwards into the trolley space, these pins being displaceable laterally outwards for spreading purposes. To this end, the pins 47 are disposed on a respective vertically-oriented rotary disc 48, these discs being driven by a common drive 49 via a circulating cable. The drive is disposed on the rear wall of the rear lateral wall 46 (cf. FIGS. 25 and 26).

During insertion of the trolley, the pins 47 are thus on the inside. After insertion they are displaced to the outside by means of a rotation of the rotary discs 48 and therefore spread the lateral walls RS. If the stacking process is terminated, the pins 47 are displaced to the inside and the intermediate plate 45 is withdrawn on the rear lateral wall 46 serving as a stripper, which means that the stack S of the packages W comes to lie on the trolley R. Then, by means of the lifting and lowering unit 10 this trolley is moved through the film wrapping unit 19 and finally on the roller conveyor 9 for onward transport. The process can then begin again.

The invention claimed is:

1. Device for automatic stacking of packages on a support in a predetermined spatial arrangement for formation of a stack in which layers of the stack comprise a plurality of packages and the stack includes packages of varying dimensions, said device comprising:
   at least one supply conveyor which provides the separated packages in a predetermined succession;
   a lifting and lowering unit for lifting and lowering a support disposed in a stacking site in a vertical Y direction; and
   a displacement device which adjoins an output end of the supply conveyor and which receives packages from the supply conveyor and transports the packages to predetermined positions in the stack in which each predetermined position in a layer for a plurality of packages comprises a different position with respect to an X and Z direction, with the X direction and Z direction being orthogonal with respect to each other and to the vertical Y direction, and wherein packages of varying dimensions within rows of a layer are accommodated by the displacement device by separately transporting such packages to the corresponding predetermined position for the packages;
   wherein the displacement device comprises:
      a positioning conveyor adjoining the output end of the supply conveyor and being disposed horizontally and longitudinally with respect to one side of the stacking site in order to selectively position the packages in a desired X direction corresponding to the predetermined position in the layer for each package,
      at least one pushing plate and a pusher in order to selectively transport the packages from the positioning conveyor in a Z direction corresponding to the predetermined position in the stack for each package;
   wherein the at least one pushing plate is formed as a flat strip-like plate, formed to be able to move horizontally and along the side of the stacking site and transverse thereto, in order to receive the packages as the packages are being pushed by the pusher off the positioning conveyor at the X direction position and to lay the packages in the Z direction on the support or in the stack in the predetermined position for each package;
   wherein the pusher is formed as an arrangement of a plurality of individual pushers disposed horizontally and along the side of the stacking site that push the packages off the positioning conveyor in the direction of the stack, wherein the individual pushers can each move independently of the at least one pushing plate in the Z direction in order to retain the package when the pushing plate is being withdrawn.

2. Device as claimed in claim 1 wherein the individual pushers have at least one common drive that can be coupled as selected to a specific individual pusher in order to drive that pusher.

3. Device as claimed in claim 2 having a moveable cross-member for the drive which cross-member comprises a carrier protruding downwards in the direction of the individual pushers and engaging into an upwardly open groove for coupling purposes.

4. Device as claimed in claim 1 wherein the at least one pushing plate is able to move back and forth in the manner of a carriage on a respective linear axle oriented in the Z direction.

5. Device as claimed in claim 1 wherein the at least one pushing plate is moveable horizontally and longitudinally with respect to one side of the stacking site.

6. Device as claimed in claim 1 wherein individual pushers are attached to a frame extending above the positioning conveyor.

7. Device as claimed in claim 6 wherein the pushing plates also lie on the frame.

8. Device as claimed in claim 6 wherein the positioning conveyor is attached to the frame.

9. Device as claimed in claim 6 wherein the frame is moveable.

10. Device as claimed in claim 1 wherein the individual pushers can move independently of one another.

11. Device as claimed in claim 2 wherein the individual pushers have at least two common drives that can be coupled as selected to a specific individual pusher in order to drive that pusher.

12. Device as claimed in claim 5 wherein the at least one pushing plate comprises at least two pushing plates that are moveable horizontally and longitudinally with respect to one side of the stacking site.

13. Device as claimed in claim 2 wherein the at least one pushing plate is able to move back and forth in the manner of a carriage on a respective linear axle oriented in the Z direction.

14. Device as claimed in claim 3 wherein the at least one pushing plate is able to move back and forth in the manner of a carriage on a respective linear axle oriented in the Z direction.

15. Device as claimed in claim 2 wherein the at least one pushing plate is moveable horizontally and longitudinally with respect to one side of the stacking site.

16. Device as claimed in claim 3 wherein the at least one pushing plate is moveable horizontally and longitudinally with respect to one side of the stacking site.

17. Device as claimed in claim 4 wherein the at least one pushing plate is moveable horizontally and longitudinally with respect to one side of the stacking site.

18. Device as claimed in claim 13 wherein the individual pushers have at least two common drives that can be coupled as selected to a specific individual pusher in order to drive that pusher.

19. Device as claimed in claim 15 wherein the individual pushers have at least two common drives that can be coupled as selected to a specific individual pusher in order to drive that pusher.

20. Device as claimed in claim 15 wherein the at least one pushing plate comprises at least two pushing plates that are moveable horizontally and longitudinally with respect to one side of the stacking site.

* * * * *